(12) United States Patent
Kobayashi et al.

(10) Patent No.: US 7,334,146 B2
(45) Date of Patent: Feb. 19, 2008

(54) METHOD FOR CONTROLLING AN IMAGE PROCESSING APPARATUS BASED ON A POWER SUPPLY STATUS

(75) Inventors: Noriyuki Kobayashi, Kawasaki (JP); Eiji Ohara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 415 days.

(21) Appl. No.: 11/007,948

(22) Filed: Dec. 9, 2004

(65) Prior Publication Data
US 2005/0138447 A1 Jun. 23, 2005

(30) Foreign Application Priority Data
Dec. 9, 2003 (JP) ............... 2003-410611

(51) Int. Cl.
*G06F 1/00* (2006.01)
(52) U.S. Cl. .............. 713/324; 713/300; 713/320; 712/228
(58) Field of Classification Search ......... 713/300, 713/320, 324; 712/228
See application file for complete search history.

(56) References Cited
U.S. PATENT DOCUMENTS 6,226,740 B1 * 5/2001 Iga .................. 713/2
6,256,252 B1 * 7/2001 Arimoto .............. 365/227
6,968,469 B1 * 11/2005 Fleischmann et al. ...... 713/324
2003/0235095 A1 * 12/2003 Inoue ................. 365/201
2005/0240755 A1 * 10/2005 Stein et al. ............ 713/1

FOREIGN PATENT DOCUMENTS
JP 6-67770 A 3/1994

* cited by examiner

*Primary Examiner*—Chun Cao
*Assistant Examiner*—Malcolm D Cribbs
(74) *Attorney, Agent, or Firm*—Rossi, Kimms & McDowell, LLP

(57) ABSTRACT

An image processing apparatus which is capable of recovering a normal operation thereof at high speed. A CPU 2001 that controls a printer 108 determines whether or not the printer 108 should be switched from a normal operation mode to a power saving mode. Responsive to input of a signal for causing the apparatus to recover the normal operation mode, the CPU 2001 reads out a power saving mode flag from a flip-flop circuit 11005, and when the flag indicates the apparatus has been switched to the power saving mode, reads out a main program from a SDRAM, whereas when the flag does not, reads out the main from a HDD 2004, for control of the printer 108.

18 Claims, 28 Drawing Sheets

METHOD FOR CONTROLLING AN IMAGE PROCESSING APPARATUS BASED ON A POWER SUPPLY STATUS

CROSS REFERENCE TO RELATED APPLICATION

This application claims priority from Japanese Patent Application No. 2003-410611 filed Dec. 9, 2003, which are hereby incorporated by reference herein.

BACKGROUND OF THE INVENTION

1. Field of the Invention

The present invention relates to an image processing apparatus and a control method therefor.

2. Description of the Related Art

To comply with energy-saving standards which have been becoming more and more strict, image forming apparatuses, such as printers, facsimile machines, digital copying machines, and digital multifunction machines, power supply to some component parts of the apparatus is shut down during standby to thereby largely reduce power consumption.

For example, in the case of an image forming apparatus of the type in which print data supplied from an external device, such as a personal computer, is expanded into bit data, which is supplied to a laser printer, interruption of energization of a fixing unit of the laser printer, stoppage of driving of a cooling fan, shutdown of power supply to a CPU, and so forth are carried out when the apparatus is in a power saving mode.

On the other hand, an image forming apparatuses designed to operate on a network is desired to be capable of recovering a normal operation mode from a power saving mode at high speed, when required.

Further, in recent digital multifunction machines, the programs for controlling the operation of the machine have increased in size, so that if all the programs are to be stored in a ROM, there is a fear of an increase in cost. To eliminate this inconvenience, some of the programs are stored in an area of a hard disk for storing images (see e.g. Japanese Laid-Open Patent Publication (Kokai) No. H06-067770).

In such an apparatus that stores programs in an area of a hard disk thereof, however, after the apparatus is started, the programs are once downloaded from the hard disk into a RAM, and then the CPU reads the programs from the RAM to execute the same, which makes it impossible to comply with the requirement of high-speed recovery of the normal operation mode.

As a solution to this problem, an apparatus has also been proposed which uses a sub CPU for use in a standby mode for saving energy. Under the recent situations in which competition for cost reduction has become intensified, it is not practical to provide a low-price apparatus with such a sub CPU.

SUMMARY OF THE INVENTION

It is an object of the present invention to provide an image processing apparatus and a control method therefor which are capable of recovering a normal operation at high speed without increase in cost, when the apparatus is switched from a second power supply status in which power consumption is reduced to a first power supply status.

To attain the above object, in a first aspect of the present invention, there is provided an image processing apparatus that performs image processing based on image data inputted thereto, comprising a controller that controls the image processing apparatus, the controller determining whether or not the image processing apparatus should be switched from a first power supply status to a second power supply status in which power consumption of the image processing apparatus is lower than in the first power supply status, a holding unit that is responsive to a determination by the controller that the image processing apparatus should be switched from the first power supply status to the second power supply status, for holding information indicative of whether or not the image processing apparatus has been switched to the second power supply status, a first storage unit that stores control data based on which the controller controls the image processing apparatus, the first storage unit being non-volatile, and a second storage unit that stores the control data read out from the first storage unit, the second storage unit being volatile, wherein the controller is responsive to input of a signal for causing the image processing apparatus to be switched from the second power supply status to the first power supply status, for reading out the information from the holding unit, the controller reading out the control data from the second storage unit in a case where the information indicates that the image processing apparatus has been switched to the second power supply status, reading out the control data from the first storage unit in a case where the information does not indicate that the image processing apparatus has been switched to the second power supply status, and controlling the image processing apparatus based on the control data.

With the arrangement of the image processing apparatus according to the first aspect of the present invention, in responsive to input of a signal for causing the image processing apparatus to be switched from the second power supply status to the first power supply status, the controller reads out the information indicative of whether or not the image processing apparatus has been switched to the second power supply status, and when the information indicates that the image processing apparatus has been switched to the second power supply status, the controller reads out the control data from the second storage unit, which is volatile, whereas when the information does not indicate that the image processing apparatus has been switched to the second power supply status, the controller reads out the control data from the first storage unit, which is not volatile. Therefore, when the image processing apparatus is switched from the second power supply status (power saving mode) in which power consumption of the image processing apparatus is lower to the first power supply status (normal operation mode), the control data can be read from the second storage unit which is volatile and different from the first storage unit which is non-volatile, whereby recovery of the normal operation mode from the power saving mode can be carried out at high speed, and the recovery can be realized by an inexpensive image processing apparatus.

Preferably, the image processing apparatus further comprises a switching unit that is responsive to the determination by the controller that the image processing apparatus should be switched to the second power supply status, for switching a power supply status of the image processing apparatus such that power supply to the controller is shut down, and the switching unit switches the power supply status such that the power supply to the controller is resumed, in response to input of the signal for causing the image processing apparatus to be switched from the second power supply status to the first power supply status, the controller being responsive to the resumption of the power supply to the controller, for reading out the information from the holing unit, the controller reading out the control data from the second storage unit when the information indicates that the image processing apparatus has been switched to the second power supply status, reading out the control data from the first storage unit when the information does not indicate that the image processing apparatus has been switched to the second power supply status, and controlling the image processing apparatus based on the control data.

Preferably, the image processing apparatus further comprises an input unit that inputs a transition instruction from a user, for switching the image processing apparatus from the first power supply status to the second power supply status, and the controller is responsive to the input of the transition instruction from the input unit, for causing the image processing apparatus to be switched from the first power supply status to the second power supply status.

Preferably, the controller causes the image processing apparatus to be switched from the first power supply status to the second power supply status, in a case where the image processing apparatus has not been in operation for not less than a predetermined time period.

Preferably, the control data comprises a control program for controlling the image processing apparatus, and the controller controls the image processing apparatus by executing the control program.

Preferably, the holding unit erases the information indicating that the image processing apparatus has been switched to the second power supply status, in a case where the power supply status of the image processing apparatus has been switched to a power shutdown status.

Preferably, the controller is responsive to input of the signal for causing the image processing apparatus to be switched from the second power-supply status to the first power supply status, for reading out the information from the holding unit, the controller reading out the control data from the first storage unit, storing the control data in the second storage unit, and then reading out the control data from the second storage unit, for control of the image processing apparatus, in a case where the information does not indicate that the image processing apparatus has been switched to the second power supply status.

Preferably, the second storage unit is DRAM and, the controller is responsive to the determination that the image processing apparatus should be switched from the first power supply status to the second power supply status, for sending a signal for starting a self-refresh operation to the second storage unit.

Preferably, the first power supply status is a status in which image processing can be carried out, and the second power supply status is a status in which the image processing cannot be carried out.

Preferably, the image processing apparatus further comprises an input unit that inputs image data from an external unit, and the signal for causing the image processing apparatus to be switched from the second power supply status to the first power supply status is outputted in response to input of image data to the input unit from the external unit.

Preferably, the image processing apparatus further comprises a receiving unit that receives an instruction given by a user, for operating the image processing apparatus, and the signal for causing the image processing apparatus to be switched from the second power supply status to the first power supply status is outputted in response to the receiving unit having received the instruction given by the user.

More preferably, in a case where a signal for causing the image processing apparatus to be switched from the second power supply status to the first power supply status is inputted, the switching unit does not switch the power supply of the image processing apparatus such that the power supply to the controller is shut down, regardless of whether a signal for causing the image processing apparatus to be switched from the first power supply status to the second power supply status is inputted or not.

To attain the above object, in a second aspect of the present invention, there is provided a method of controlling an image processing apparatus that performs image processing based on image data inputted thereto, comprising a determining step of determining whether or not the image processing unit should be switched from a first power supply status to a second power supply status in which power consumption of the image processing apparatus is lower than in the first power supply status, a holding step of holding information indicative of whether or not the image processing apparatus has been switched to the second power supply status, in response to a determination in the determining step that the image processing apparatus should be switched from the first power supply status to the second power supply status, a reading step of reading out the information held in the holding step, in response to input of a recovery signal for causing the image processing apparatus to be switched from the second power supply status to the first power supply status, and a control step of reading out control data for controlling the image processing apparatus from a first storage unit which is non-volatile, in a case where the information read out in the reading step does not indicate that the image processing apparatus has been switched to the second power supply status, and reading out the control data from a second storage unit which is volatile, in a case where the information indicates that the image processing apparatus has been switched to the second power supply status.

Preferably, the method further comprises an output step of outputting a transition signal for causing the image processing apparatus to be switched from the second power supply status to the first power supply status, a first switching step of switching a power supply status of the image processing apparatus such that power supply to a controller that executes the control step is shut down, in response to the transition signal outputted in the output step, and a second switching step of switching the power supply status of the image processing apparatus from the second power supply status to the first power supply status such that the power supply to the controller is resumed, in response to the input of the recovery signal.

Preferably, the method further comprises an input step of inputting a transition instruction from a user, for switching the image processing apparatus from the first power supply status to the second power supply status, and the control step comprises causing the image processing apparatus to be switched from the first power supply status to the second power supply status, in response to the input of the transition instruction in the input step.

Preferably, the control step comprises causing the image processing apparatus to be switched from the first power supply status to the second power supply status, in a case where the image processing apparatus has not been in operation for not less than a predetermined time period.

Preferably, the control data comprises a control program for controlling the image processing apparatus, and the control step comprises controlling the image processing apparatus by executing the control program.

Preferably, the holding step comprises erasing the information indicating that the image processing apparatus has been switched to the second power supply status, in a case where the power supply status of the image processing apparatus has been switched to a power shutdown status.

Preferably, the control step comprises reading out the control data from the first storage unit, storing the control data in the second storage unit, and then reading out the control data from the second storage unit, for control of the image processing apparatus, in a case where the information read out in the reading step does not indicate that the image processing apparatus has been switched to the second power supply status.

Preferably, the control step comprises sending a signal for starting a self-refresh operation to the second storage unit, in response to the determination in the determining step that the image processing apparatus should be switched from the first power supply status to the second power supply status.

Preferably, the first power supply status is a status in which image processing can be carried out, and the second power supply status is a status in which the image processing cannot be carried out.

Preferably, the method further comprises an input step of inputting image data from an external unit, and the signal for causing the image processing apparatus to be switched from the second power supply status to the first power supply status is outputted in response to input of image data from the external unit in the input step.

Preferably, the method further comprises a receiving step of receiving an instruction given by a user, for operating the image processing apparatus, and the recovery signal for causing the image processing apparatus to be switched from the second power supply status to the first power supply status is outputted in response to the instruction given by the user having been received in the receiving step.

More preferably, in a case where a signal for causing the image processing apparatus to be switched from the second power supply status to the first power supply status is inputted, the power supply of the image processing apparatus is not switched such that the power supply to the controller is shut down, regardless of whether a signal for causing the image processing apparatus to be switched from the first power supply status to the second power supply status is inputted or not.

The above and other objects, features and advantages of the invention will become more apparent from the following drawings taken in conjunction with the accompanying drawings.

DETAILED DESCRIPTION OF THE PREFERRED EMBODIMENTS

Figure 1:
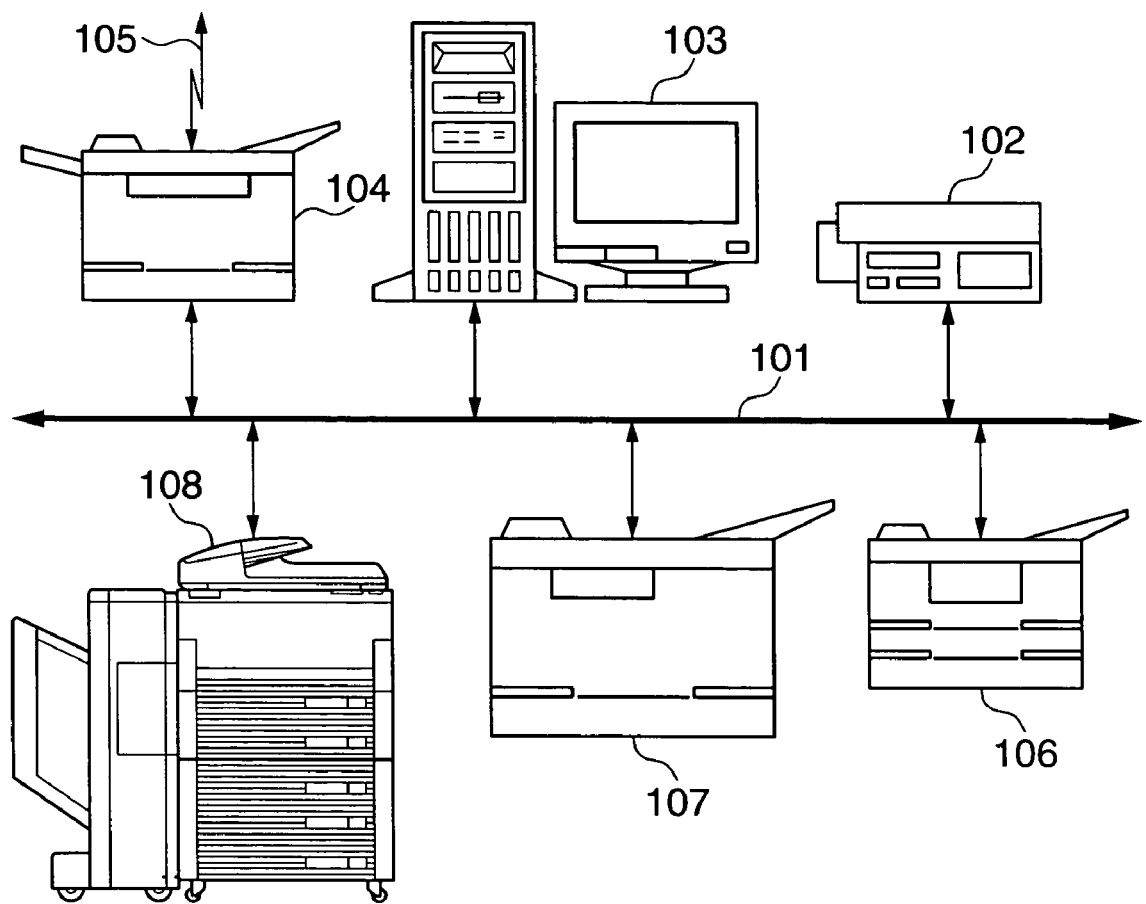
FIG. 1 is a block diagram showing the arrangement of a printing system incorporating an image forming apparatus as an image processing apparatus according to a first embodiment of the present invention.

The present invention will now be described in detail with reference to the drawings showing preferred embodiments thereof. In the drawings, elements and parts which are identical throughout the views are designated by identical reference numerals, and duplicate description thereof is omitted.

FIG. 1 is a block diagram showing the arrangement of a printing system incorporating an image forming apparatus as an image processing apparatus according to a first embodiment of the present invention.

In FIG. 1, reference numeral 101 designates a network for connecting between the component elements of the printing system, and in the present embodiment, the network is assumed to be implemented by an Ethernet (registered trademark) using TCP/IP protocols.

Reference numeral 102 designates a network scanner that optically reads an original or the like printed on a sheet, and is provided with a network interface. The network scanner is implemented by a color scanner that reads and outputs image data of the three colors of RGB.

Reference numerals 108, 107, and 106 designate network printers each of which is equipped with a network interface, and receives print data and image data via the network interface, to actually print the received data on sheets or the like using a known printing technique, such as electrophotography. In the illustrated example, the network printer 108 is implemented by a monochrome digital multifunction machine, the network printer 107 by a color laser printer, and the network printer 106 by a monochrome laser printer.

Reference numeral 104 designates a facsimile machine which is equipped with a network interface and transmits and receives image data via a public line 105. More specifically, the facsimile machine 104 transmits image data read by the scanner 102 on the network 101 to the public line 105, outputs image data received from the public line 10.5 via the printers 108, 107, and 106, transmits and receives image data in the form of files to and from a PC (Personal Computer) 103 via the public line 105, and performs like operations.

Figure 2:
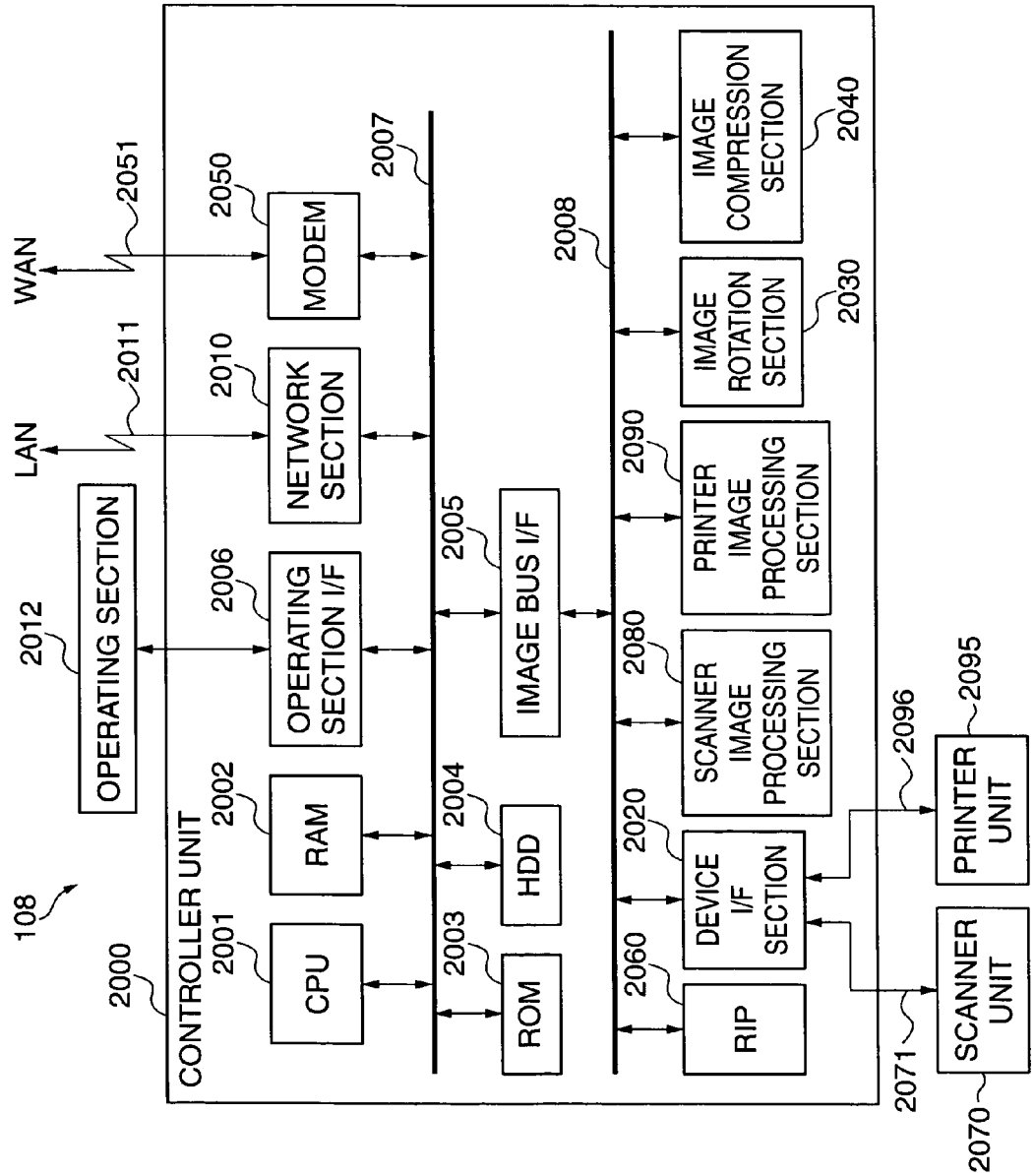
FIG. 2 is a block diagram showing the hardware configuration of a controller unit of a printer appearing in FIG. 1.

FIG. 2 is a block diagram showing the hardware configuration of a controller unit of the printer (multifunction machine) 108 appearing in FIG. 1. The hardware configurations of the control sections of the printers 107 and 106 are approximately the same as that shown in FIG. 2.

In FIG. 2, the controller unit (information processing apparatus) 2000 is connected to a scanner unit 2070 as an image input device and a printer unit 2095 as an image output device, and further to a LAN 2011 and a public line (WAN) 2051, for controlling the input and output of image information and device information.

A CPU (Central Processing Unit) 2010 is a controller controlling the overall system. A RAM (volatile storage device) 2002 is a system work memory used for the CPU 2001 to operate, and also serves as an image memory for temporarily storing image data. A ROM (non-volatile storage device) 2003 is a boot ROM that stores a boot program of the system. A HDD (non-volatile large-capacity storage device) 2004 is comprised of a hard disk drive and an IDE controller, and stores system software, image data, and management information thereof.

An operating section I/F 2006 interfaces with an operating section (UI) 2012, so as to output image data to be displayed on the operating section 2012 to the same and send information that the user has inputted to the operating section 2012 to the CPU 2001. A network section 2010 is connected to the LAN 2011 to input and output information. A MODEM 2050 is connected to the public line 2051 to input and output information.

The component elements (devices) described above are connected to a system bus 2007.

An image bus I/F 2005 is a bus bridge that connects between the system bus 2007 and an image bus 2008 that transfers image data at high speed and converts the data structure. The image bus 2008 is implemented by a PCI bus or an IEEE 1394 bus. Component elements (devices) 2020, 2030, 2040, 2060, 2080, and 2090, referred to hereinafter, are connected to the image bus 2008.

The raster image process (RIP) 2060 expands a PDL (page-description language) code into a bit map image. The device I/F section 2020 connects the scanner unit 2070 and the printer unit 2095 to the controller unit 2000 to carry out synchronous to asynchronous conversion of image data. The scanner image processing section 2080 corrects, processes, and edits inputted image data. The printer image processing section 2090 performs correction, resolution conversion, and so forth, on image data for printing output, so as to adapt the image data to the performance of the printer unit 2095. An image rotation section 2030 rotates image data. The image compression section 2040 performs various compression/decompression processes, such as a JPEG (Joint Photographic Experts Group) process for the multivalued image data, and JBIC (Joint Bi-level Image experts Group), MMR (Modified Modified READ), and MH (Modified Huffman) processes for the binary image data.

Figure 3:
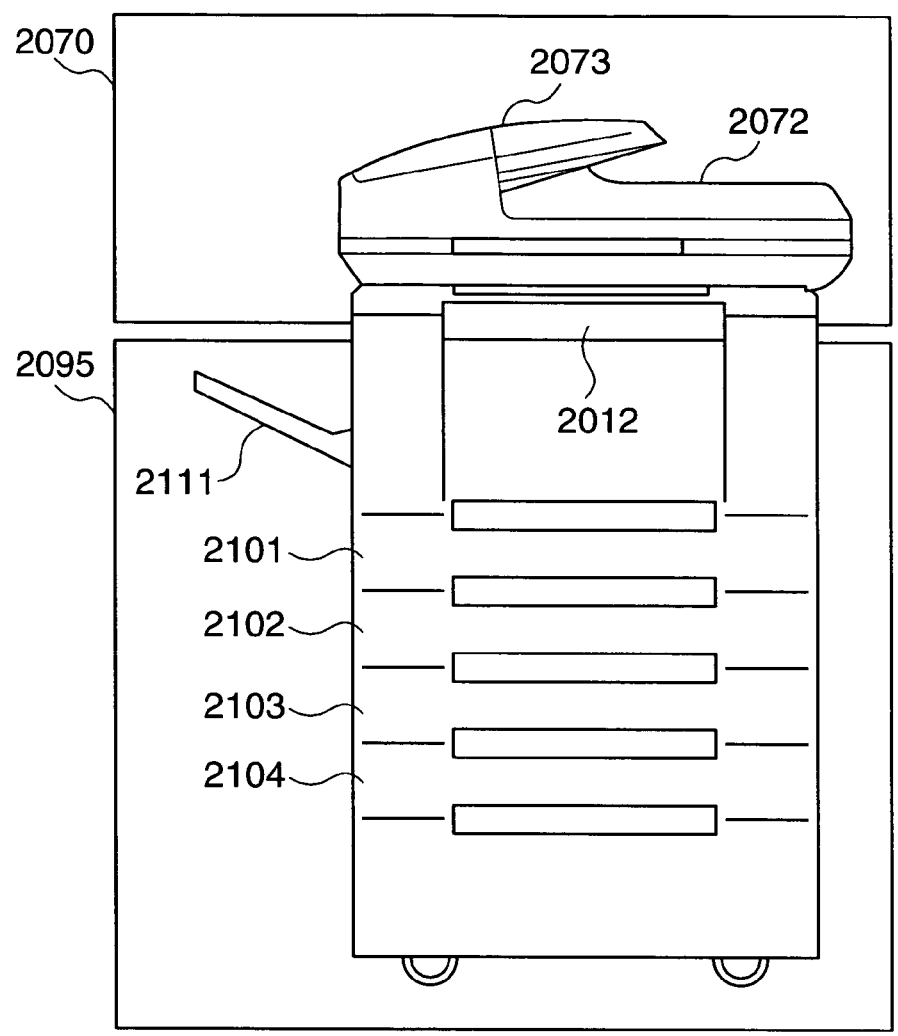
FIG. 3 is a view showing the appearance of a scanner unit and a printer unit appearing in FIG. 2.

FIG. 3 is a diagram showing the appearance of the scanner unit 2070 and the printer unit 2095 appearing in FIG. 2.

The scanner unit 2070 as the image input device illuminates an image on a sheet as an original (original sheet), and converts an optical signal obtained by scanning a CCD line sensor, not shown, over the image into an electric signal as raster image data (which is transmitted via a line 2071 in FIG. 2). Original sheets are set on a tray 2073 of an original feeder 2072, and in response to an instruction for starting reading of the image, which is inputted by the user of the printer 108 via the operating section 2012, the CPU 2001 (FIG. 2) delivers an instruction (which is transmitted via the line 2071 in FIG. 2) to the scanner unit 2070, whereby the original feeder 2072 feeds the original sheets, one by one, and original images thereon are read.

The printer unit 2095 as the image output device converts raster image data (transmitted via a line 2096 in FIG. 2) into an image, and transfers the image onto the sheet. As the method of transferring the image, there may be employed any of electrophotography using a photosensitive drum and a photosensitive belt, an ink jet method in which ink is ejected from a minute nozzle array to directly print an image on a sheet, and so forth. The operation of the printer unit 2095 is started by an instruction from the CPU 2001 (which is transmitted via the line 2096 in FIG. 2). The printer unit 2095 has a plurality of sheet feeder stages for selection of a different sheet size or a different sheet orientation therefrom, and sheet cassettes 2101, 2102, 2103, and 2104 are provided for use at the respective feeder stages. A discharge tray 2111 receives sheets for which printing is completed.

Figure 4:
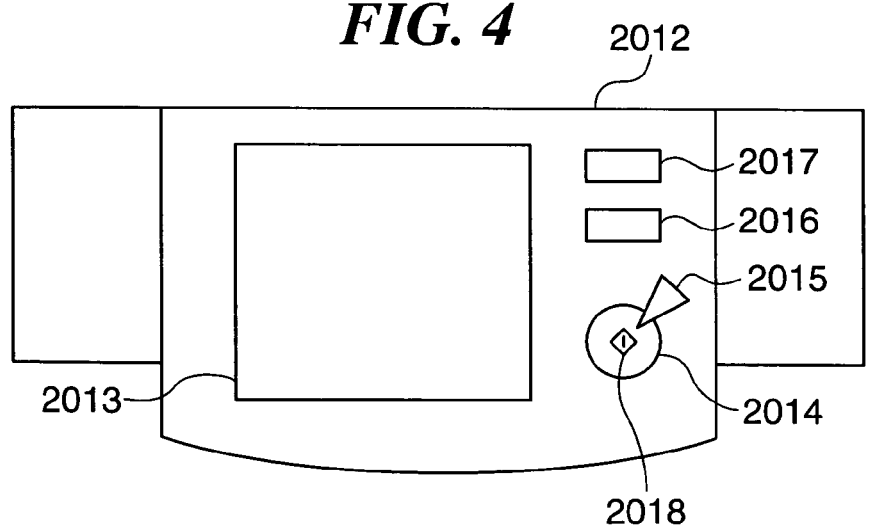
FIG. 4 is a block diagram showing the appearance of an operating section appearing in FIG. 2.

FIG. 4 is a diagram showing the appearance of the operating section 2012 appearing in FIG. 2.

In FIG. 4, a LCD display section 2013 is comprised of a LCD (Liquid Crystal Display) and a touch panel sheet attached thereto, whereby the operating screen of the system is displayed, and when a key displayed on the screen is depressed, position information on the depressed key is sent to the CPU 2001. A start key 2014 is operated to start the reading of an original image. In the center of the start key 2014, two LEDs 2018 of green and red are arranged to indicate whether the start key 2014 is ready, by the emitted light. A stop key 2015 is operated to stop the running operation. An ID key 2015 is operated to enter the user ID of the user. A reset key 2017 is operated to initialize the settings set by the operating section 2012.

Figure 5:
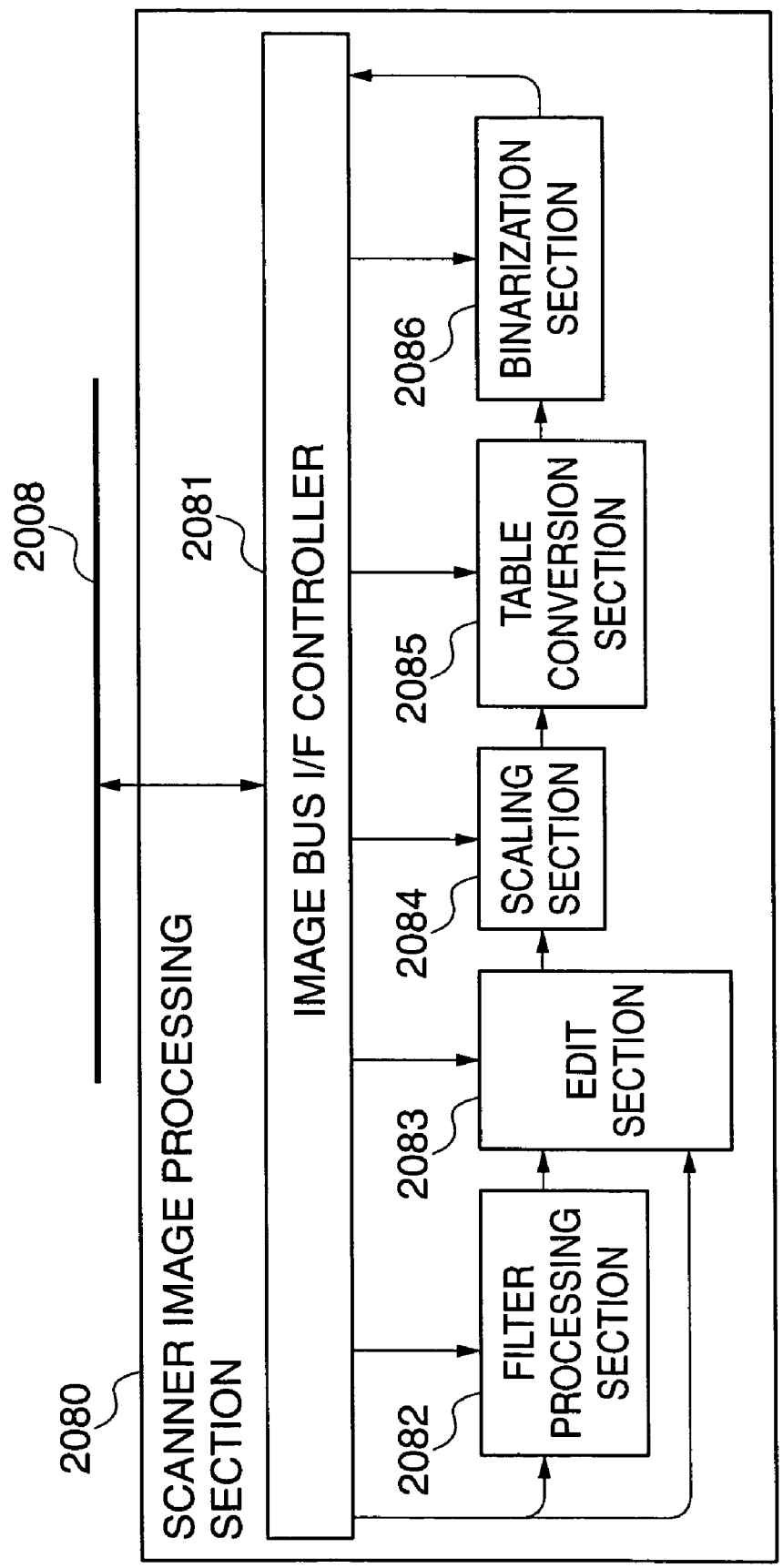
FIG. 5 is a block diagram showing the internal arrangement of a scanner image processing section appearing in FIG. 2.

FIG. 5 is a block diagram showing the internal arrangement of the scanner image processing section 2080.

In FIG. 5, an image bus I/F controller 2081 is connected to the image bus 2008, for control of bus access sequence thereof. Further, the image bus I/F controller 2081 controls the devices of the scanner image processing section 2080, and generates a timing signal. A filter processing section 2082 is implemented by a spatial filter, to perform a convolution operation. An edit section 2083 performs an image editing process, in which, for example, a closed area surrounded by a marker-pen line written on an original to be copied is first recognized, and then, image processing, such as shading, hatching, and negative-positive inversion, is performed on the image data within the closed area.

A zooming section 2084 carries out enlargement and reduction of a read image, and the size of the raster image is enlarged or reduced in the main scanning direction by executing interpolation, and the size enlargement and size reduction in the sub scanning direction is carried out by changing the speed of scanning a reading line sensor, not shown. A table conversion section 2085 converts the read image data as brightness data into density data using a table. A binarization section 2086 binarizes multivalued gray-scale image data by an error diffusion process or a screen process.

The image data having gone through the image processing is transferred onto the image bus 2008 again via the image bus I/F controller 2081.

Figure 6:
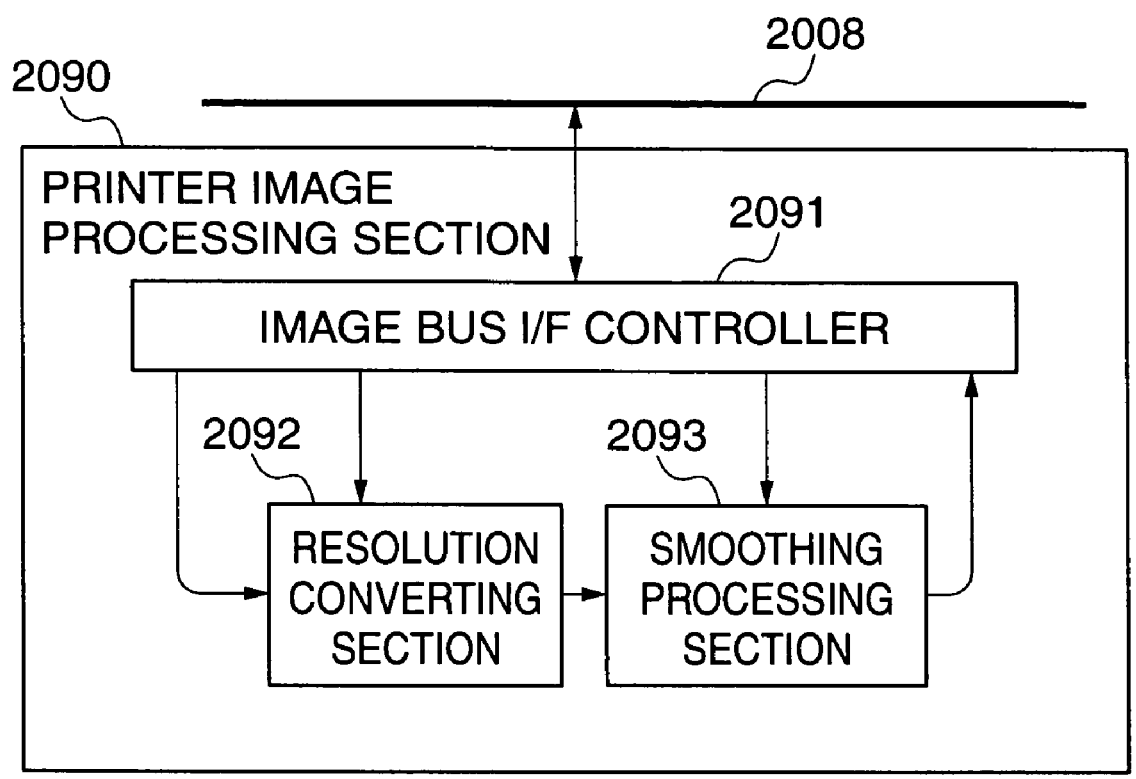
FIG. 6 is a block diagram showing the internal arrangement of a printer image processing section appearing in FIG. 2.

FIG. 6 is a block diagram showing the internal arrangement of the printer image processing section 2090.

In FIG. 6, an image bus I/F controller 2091 is connected to the image bus 2008, for control of bus access sequence thereof. Further, the image bust I/F controller 2091 controls the devices of the scanner image processing section 2090, and generates a timing signal. A resolution converting section 2092 converts the resolution of image data sent from the LAN 2011 or the public line 2051 into a resolution adapted to the resolution of the printer unit 2095. A smoothing section 2093 carries out processing for smoothing jaggy portions of the image data subjected to the resolution conversion (irregularities appearing at a boundary of a white area and a black area, such as those of a slanted line).

Figure 7:
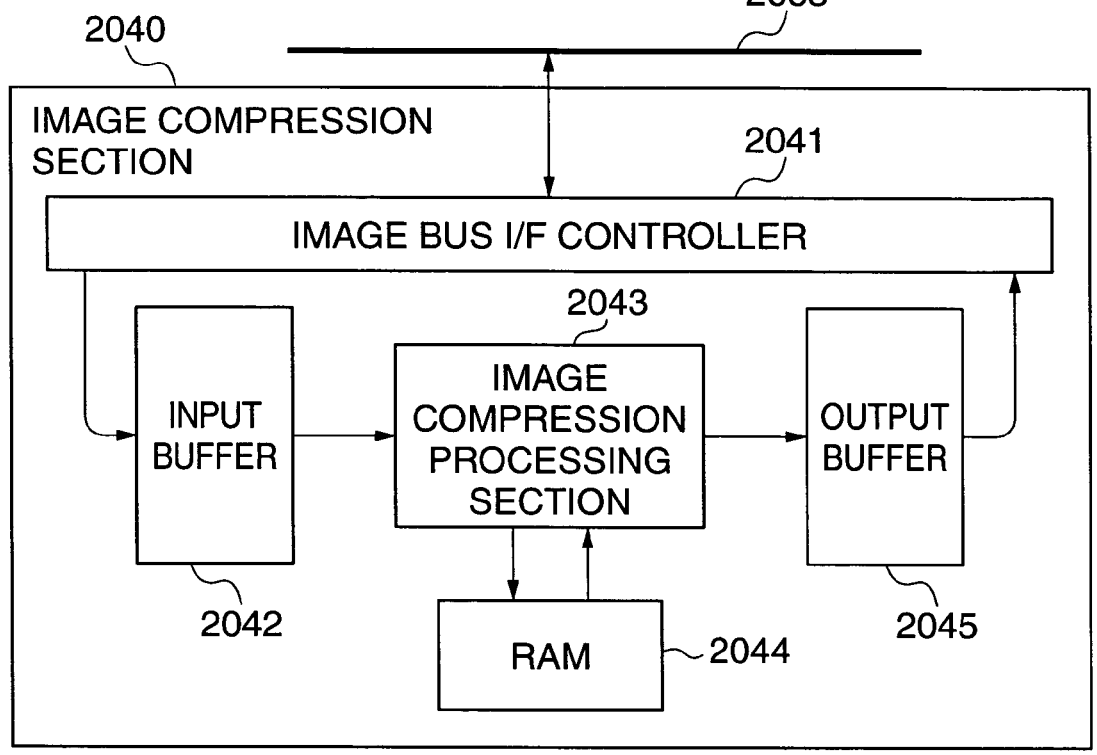
FIG. 7 is a block diagram showing the internal arrangement of an image compression section appearing in FIG. 2.

FIG. 7 is a block diagram showing the internal arrangement of the image compression section 2040 appearing in FIG. 2.

In FIG. 7, an image bus I/F controller 2041 is connected to the image bus 2080 for control of bus access sequence thereof. Further, the image bus I/F controller 2041 controls timing in which data are transmitted to an input buffer 2042 and received from an output buffer 2045. The image bus I/F controller 2041 also controls an image compression processing section 2043, e.g. by setting operation modes thereof.

Next, a description will be given of the procedure of an image compression process executed by the image compression section 2040.

First, the CPU 2001 (see FIG. 2) sets up the image bus I/F controller 2041 for control of image compression, via the image bus 2008. The image bus I/F controller 2041 thus set up executes settings of the image compression processing section 2043 necessary for image compression (e.g. settings of MMR compression, JBIC expansion, or the like.). After these necessary settings are executed, the CPU 2001 permits transfer of image data to the image bus I/F controller 2041. In response to the permission, the image bus I/F controller 2041 starts transfer of image data from the RAM 2002 (FIG. 2) or devices on the image bus 2008.

More specifically, the image bus I/F controller 2041 receives image data from the RAM 2002 or the devices on the image bus 2008, and temporarily stores the image data in the input buffer 2042. Then, in response to a request of the image compression processing section 2043 for transfer of image data, the controller 2041 transfers image data from the input buffer 2042 to the image compression processing section 2043 at a constant speed. Before doing this, the input buffer 2042 determines whether or not image data can be transferred between the image bus I/F controller 2041 and the image compression processing section 2043, and if it is impossible to read the image data from the image bus and write an image into the image compression processing section 2043, inhibits the transfer of the image data (such control is called "handshaking control").

The image compression processing section 2043 once stores the received image data in the RAM 2044. This is because depending on the type of image compression processing to be carried out, the image compression necessitates several lines of data, i.e. the image compression of a first one line can be executed only after several lines of data become available.

The image data obtained through the image compression by the image compression processing section 2043 is immediately sent to the output buffer 2045. The output buffer 2045 also performs the handshaking control between the image bus I/F controller 2041 and the image compression processing section 2043, and then transfers the image data to the image bus I/F controller 2041. The image bus I/F controller 2041 transfers the received compressed (or expanded) image data to one of the RAM 2002 and the devices on the image bus 2008.

The above described sequence of processing operations is repeatedly carried out until a processing request is no longer is issued by the CPU 2001 (until processing of all the pages necessitating the image compression processing is completed), or until a stop request (generated when an error occurs during compression or expansion) is issued by the image compression processing section 2043.

Figure 8:
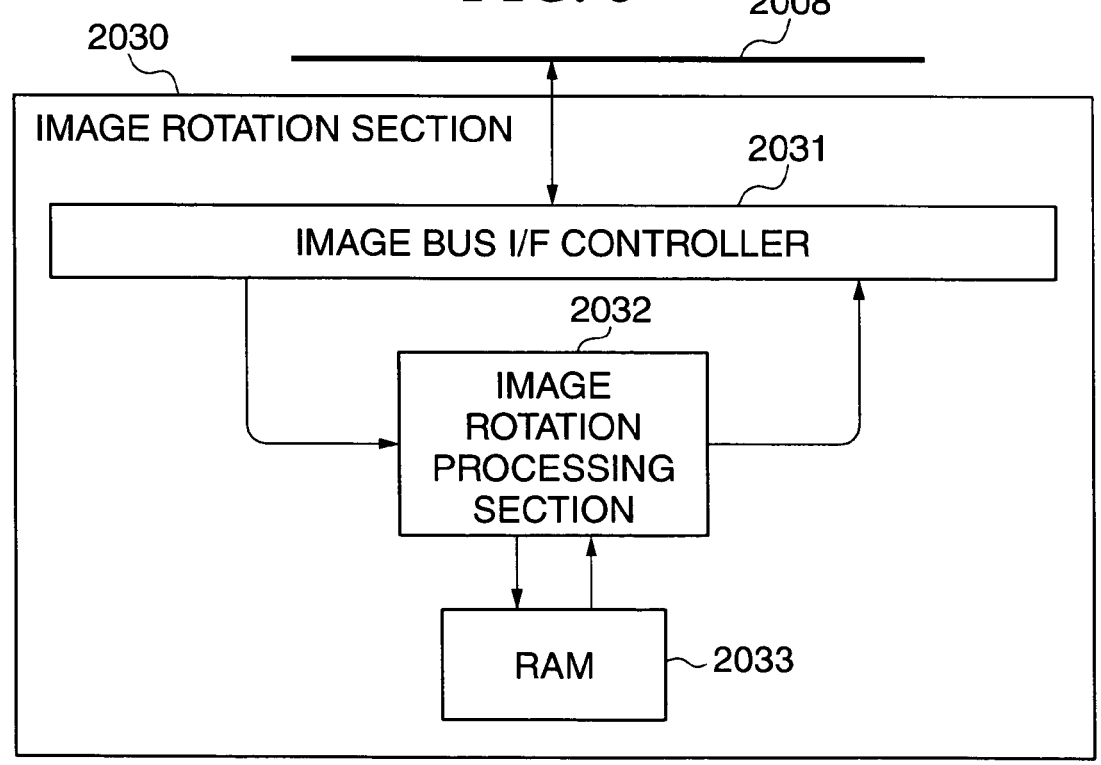
FIG. 8 is a block diagram showing the internal arrangement of an image rotation section appearing in FIG. 2.

FIG. 8 is a block diagram showing the internal arrangement of the image rotation section 2030 appearing in FIG. 2.

In FIG. 8, an image bus I/F controller 2031 is connected to the image bus 2008, for control of bus access sequence thereof. Further, the image bus I/F controller 2031 controls an image rotation processing section 2032, e.g. by setting operation modes thereof, and timing in which image data is transferred to the image rotation processing section 2032.

Next, a description will be given of the procedure of an image rotation process executed by the image rotation section 2030.

First, the CPU 2001 (in FIG. 2) sets up the image bus I/F controller 2031 for control of image rotation, via the image bus 2008. The image bus I/F controller 2031 thus set up executes settings of the image rotation processing section 2032 necessary for image rotation (e.g. settings of image size, direction of rotation, an angle of rotation, etc.). After these necessary settings are executed, the CPU 2001 permits transfer of image data to the image bus I/F controller 2031. In response to the permission, the image bus I/F controller 2031 starts transfer of image data from the RAM 2002 (FIG. 2) or devices on the image bus 2008. Here, it is assumed that image data is transferred in units of 32 bits, and the size of image data to be rotated is 32×32 (bits). Further, when the image data is transferred onto the image bus 2008 as well, the transfer of the image data is carried out in units of 32 bits (image data to be processed is assumed to be binary).

Figure 9:
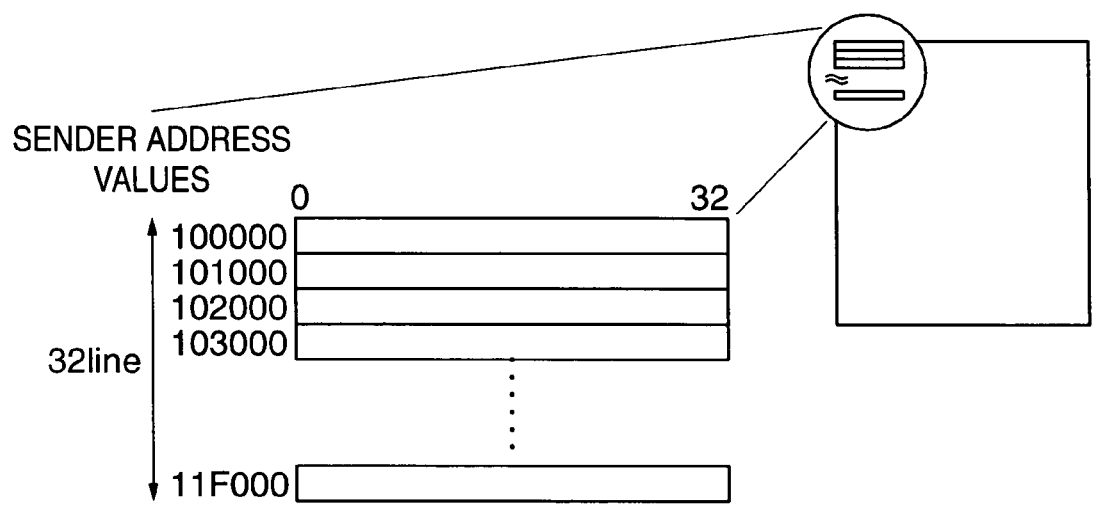
FIG. 9 is a diagram showing the relationship between an image data of 32×32 bits and non-contiguous sender address values.

To obtain 32×32-bits image data as described above, it is necessary to carry out the above 32 bits unit transfer of data 32 times, and at the same time, the image data need to be transferred using non-contiguous sender address values. FIG. 9 is a diagram useful in explaining the relationship between 32×32-bits image data and non-contiguous sender address values.

Figure 10:
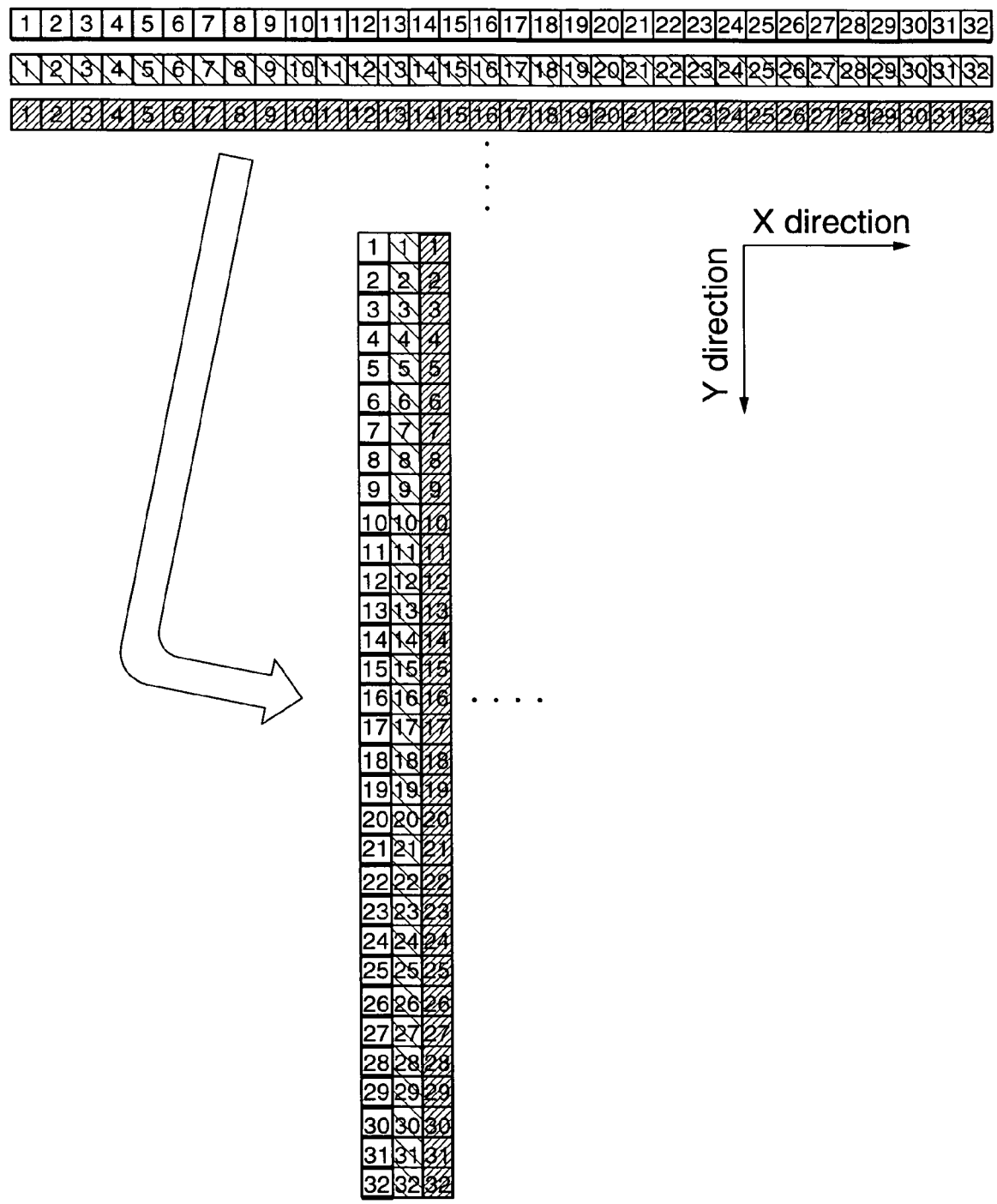
FIG. 10 is a diagram useful in explaining writing of image data into a RAM on a 32 bits-by-32 bits basis.

The image data transferred by non-contiguous addressing is written into a RAM 2033 such that the image is in a position rotated through a desired angle when it is read out. More specifically, when the image is anticlockwise rotated through 90 degrees, a first transferred set of 32 bits of image data is written into the RAM 2033 in a Y direction as shown in FIG. 10, and read out therefrom in a X direction, whereby the image is rotated. FIG. 10 is a diagram useful in explaining writing of the image data into the RAM 2033 on a 32 bits-by-32 bits basis.

After the rotation of a 32×32-bits data image (writing of data thereof into the RAM 2033) is completed, the image rotation processing section 2032 reads out image data from the RAM 2031 in the X direction, and transfers the same to the image bus I/F controller 2031.

The image bus I/F controller 2031 receives the image data subjected to the image rotation process, and transfers the same to one of the RAM 2002 and the devices on the image bus 2008 by contiguous addressing.

The above described sequence of processing operations is repeatedly carried out until a processing request is no longer is issued by the CPU 2001 (until processing of all the pages necessitating the image compression processing is completed).

Figure 11:
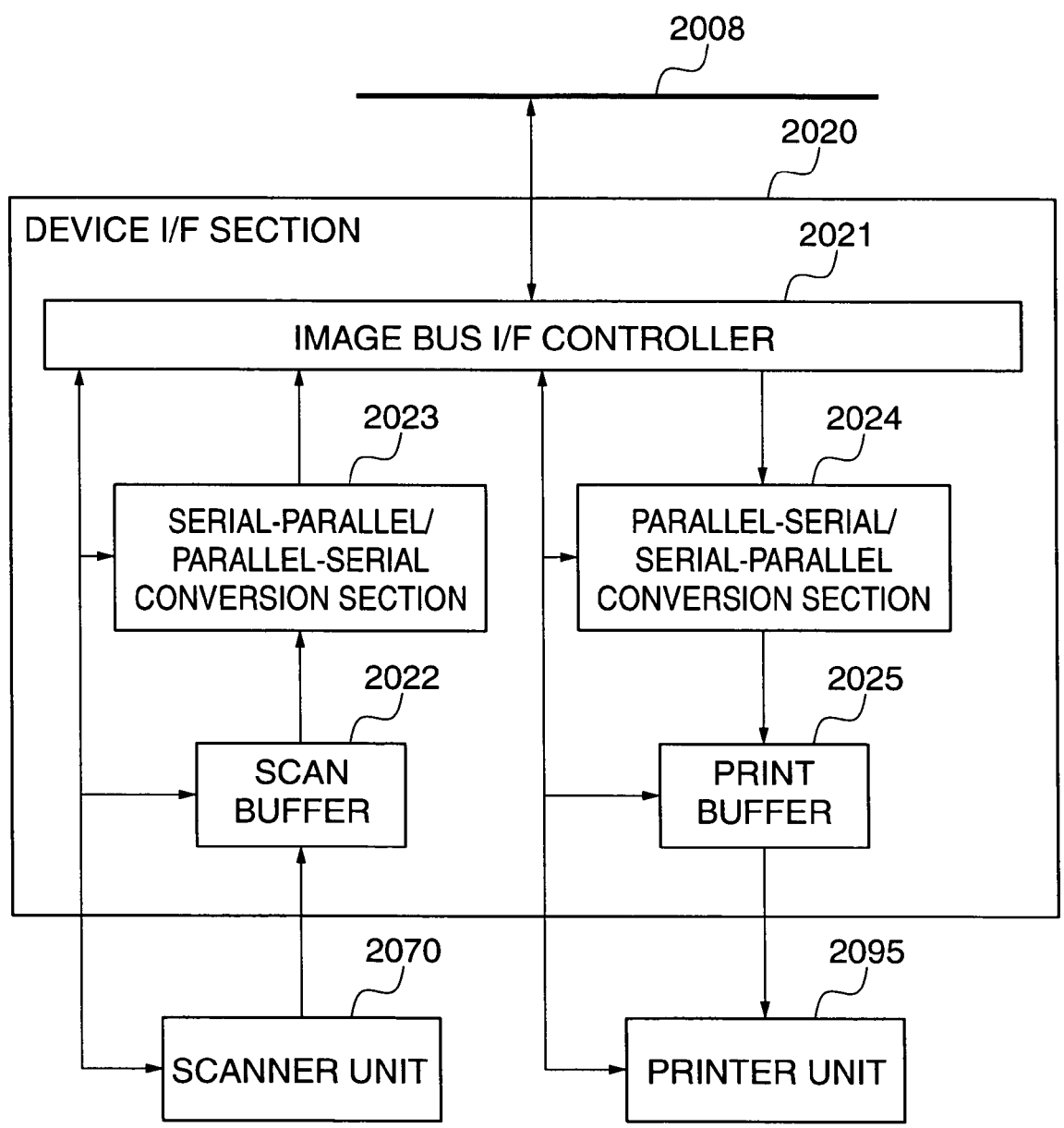
FIG. 11 is a block diagram showing the internal arrangement of a device I/F appearing in FIG. 2.

FIG. 11 is a block diagram showing the internal arrangement of the device I/F section 2020 appearing in FIG. 2.

In FIG. 11, an image bus I/F controller 2021 is connected to the image bus 2008, for control of bus access sequence thereof. Further, the image bus IF controller 2021 controls the devices of the device I/F section 2020, and generates a timing signal. The image bus I/F controller 2021 also generates control signals transmitted to the scanner unit 2070 and the printer unit 2095 provided outside thereof. A scan buffer 2022 temporarily stores image data sent from the scanner unit 2070, and outputs the same in synchronism with the operation of the image bus 2080. A serial-parallel/parallel-serial conversion section 2023 sequentially arranges or decomposes the image data stored in the scan buffer 2022 and converts the same into image data having a data width which can be transmitted through the image bus 2008. A parallel-serial and serial-parallel conversion section 2024 decomposes or sequentially arranges the image data transferred from the image bus 2008, and converts the same into image data having a data width which can be stored in a print buffer 2025. The print buffer 2025 temporarily stores the image data sent from the image bus 2008, and outputs the same to the printer unit 2095 in synchronism with the operation of the printer unit 2095.

Next, a description will be given of the operation of the device I/F section 2020 when the scanner unit 2070 performs image scanning.

The device I/F section 2020 stores the image data sent from the scanner unit 2070 in the scanner buffer 2022 in synchronism with the timing signal sent from the scanner unit 2070. Then, if the image bus 2008 is implemented by a PCI bus, when not less than 32 bits of image data have entered the scan buffer 2022, 32 bits of image data are sent according to the first-in first-out method from the scan buffer 2022 to the serial-parallel/parallel-serial conversion section 2023, wherein the data is converted into 32-bit image data, and then transmitted to the image bus 2008 via the image bus I/F controller 2021. On the other hand, if the image bus 2008 is implemented by an IEEE1394 bus, the image data in the scan buffer 2022 is sent according to the first-in first-out method from the scan buffer 2022 to the serial-parallel/parallel-serial conversion section 2023, wherein the data is converted into serial image data, and transferred to the image bus 2009 via the image bus I/F controller 2021.

Next, a description will be given of the operation of the device I/F section 2020 when image printing is performed.

When the image bus 2008 is implemented by a PCI bus, 32-bit image data transmitted from the image bus 2008 is received by the image bus I/F controller 2021, and sent to the parallel-serial/serial-parallel conversion section 2024, wherein the image data is converted into image data adapted to the input data bit number of the printer unit 2095 and stored in the print buffer 2025. On the other hand, if the image bus 2008 is implemented by an IEEE1394 bus, the serial image data sent from the image bus 2008 is received by the image bus I/F controller 2021, and sent to the parallel-serial/serial-parallel conversion section 2024, wherein the image data is converted into image data adapted to the input data bit number of the printer unit 2095 and stored in the print buffer 2025. Then, the image is sent from the print buffer 2025 in synchronism with the timing signal sent from the printer 2025 according to the first-in first-out method, to the printer unit 2095.

Figure 12:
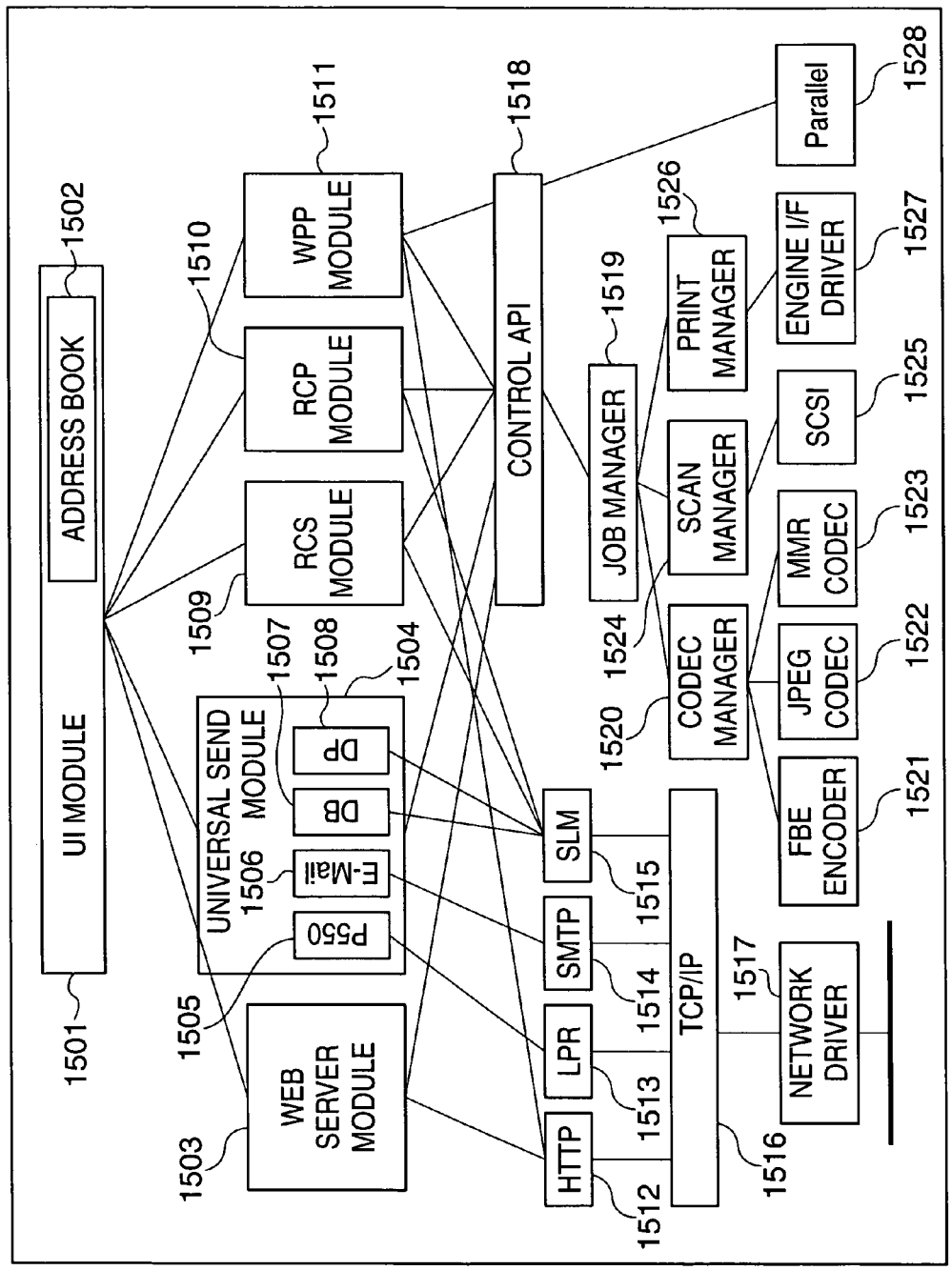
FIG. 12 is a block diagram showing the software configuration of a control section of the printer appearing in FIG. 1.

FIG. 12 is a block diagram showing the software configuration of a control section of the printer 108 appearing in FIG. 1. The software configuration of the respective control sections of the printers 107 and 106 are also basically approximately the same as that of the printer 108 shown in FIG. 12.

In FIG. 12, reference numeral 1501 designates a UI (User Interface) module, and interfaces between the printer 108 and a user when the user carries out various processing and setting operations. This module transmits information inputted to the same by user's operations, to various modules, referred to hereinafter, to make requests for processing, perform settings of data, etc.

Reference numeral 1502 designates an address book, i.e. a database which manages destinations of transfer of (i.e. recipients of) data, those of communications, and the like. Data is added to, deleted from, and acquired from the address book 1502 in response to instructions from the UI module 1501, and the address book 1502 is used for giving information on a destination of data transfer or communication to each of modules, described hereinafter.

Reference numeral 1503 designates a Web server module used for notifying the management information on the printer 108 to a Web client in response to a request made by the Web client. The management information is read from the printer 108 via a control API 1518, referred to hereinafter, and notified to the Web client via a HTTP module 1512, a TCP/IP module 1516, and a network driver 1517.

Reference numeral 1504 designates a universal send module which is responsible for distribution of data. The universal send module 150 distributes data designated by the user via the UI module 1501 to destinations of communication (output) also designated by the user. Further, when the user gives an instruction to generate distribution data by making use of the scanner function of the present printer 108, the universal send module 150 causes the scanner unit 2070 to operate, via the control API 1518, to thereby generate data.

Reference numeral 1505 designates a P550 module that is executed when one or more printers are designated as output destinations by the universal send module 150.

Reference numeral 1506 designates an E-mail module that is executed when one or more E-mail addresses are designated as communicating destinations by the universal send module 150.

Reference numeral 1507 designates a DB module that is executed when one or more databases are designated as output destinations by the universal send module 150.

Reference numeral 1508 designates a DP module that is executed when one or more multifunction printers similar to the present printer 108 are designated as output destinations by the universal send module 150.

Reference numeral 1509 designates a RCS (Remote-Copy-Scan) module that uses the scanner function of the present printer 108, and performs a process equivalent to that performed by the scanner function realized singly by the present printer 108, with one or more output destinations set to other multifunction printers connected to the present printer via the network or the like.

Reference numeral 1510 designates a RCP (Remote-Copy-Print) module that uses the printer function of the present printer 108, and performs a process equivalent to that performed by the printer function realized singly by the present printer 108, with one or more output destination set to other multifunction printers connected to the present printer via the network or the like.

Reference numeral 1511 designates a WPP (Web-Pull-Print) module that reads out information of various Web pages on the Internet or an intranet, and performs printing.

Reference numeral 1512 designates a HTTP (Hypertext Transfer Protocol) module that is used by HTTP for communication, and provides a communication capability to the aforementioned Web server module 1503 and the WPP module 1511, together with a TCP/IP module 1516, described hereinafter.

Reference numeral 1513 designates a LPR module that provides a communication capability to the aforementioned P550 module 1505 of the universal send module 150, together with the TCP/IP module 1516.

Reference numeral 1514 designates a SMTP module that provides a communication capability to the aforementioned E-mail module 1508, together with the TCP/IP module 1516.

Reference numeral 1515 designates a SLM (Salutation-Manager) module that provides a communication capability to the aforementioned DB module 1507, DP module 1508, RCS module 1509, and RCP module 1510 of the universal send module 150, together with the TCP/IP module 1516.

Reference module 1516 designates the TCP/IP module that provides the communication capability to the aforementioned various modules, together with a network driver 1517, described next.

Reference numeral 1517 designates the network driver that controls devices physically connected to the network.

Reference numeral 1518 designates the control API that provides upstream modules, such as the universal send module 150, with an interface for interfacing between the upstream modules and downstream modules, such as a job manager 1519, for alleviating the mutual dependency between the upstream modules and the downstream modules to enhance compatibility or versatility of each module.

Reference numeral 1519 designates the job manager that interprets a process designated by each of the aforementioned modules via the control API 1518, to give an instruction to each of modules, referred to hereinafter. Further, the present module carries out the collective management of hardware-based processes executed by the present printer 108.

Reference numeral 1520 designates a CODEC manager that manages and controls various kinds of compression and expansion processes designated by the job manager 1519.

Reference numeral 1521 designates a FBE encoder that compresses data read by the scanning process executed by the job manager 1519 and a scan manager 1524, using a FBE format.

Reference numeral 1522 designates a JPEG-CODEC that performs JPEG compression of read data and JPEG expansion of print data, during execution of the scanning process by the job manager 1519 and the scan manager 1524, and during execution of the printing process by a print manager 1526.

Reference numeral 1523 designates a MMR-CODEC that performs MMR compression of read data and MMR expansion of print data, during execution of the scanning process by the job manager 1519 and the scan manager 1524, and during execution of the printing process by the print manager 1526.

Reference numeral 1524 designates the scan manager that manages and controls the scanning process designated by the job manager 1519.

Reference numeral 1525 designates a SCSI driver that performs communications between the scan manager 1524 and the scanner unit 2070 to which the printer 108 is internally connected.

Reference numeral 1526 designates the print manager that manages and controls the printing process designated by the job manager 1519.

Reference numeral 1527 designates an engine I/F driver that provides an interface between the print manager 1526 and the printer unit 2095.

Reference numeral 1528 designates a parallel port driver (Parallel) that provides an interface between the WPP module 1511 and an output device, not shown, when the WPP module 1511 outputs data to the output device via a parallel port.

Next, a description will be given of applications installed in the printer 108, with reference to FIG. 13.

Figure 13:
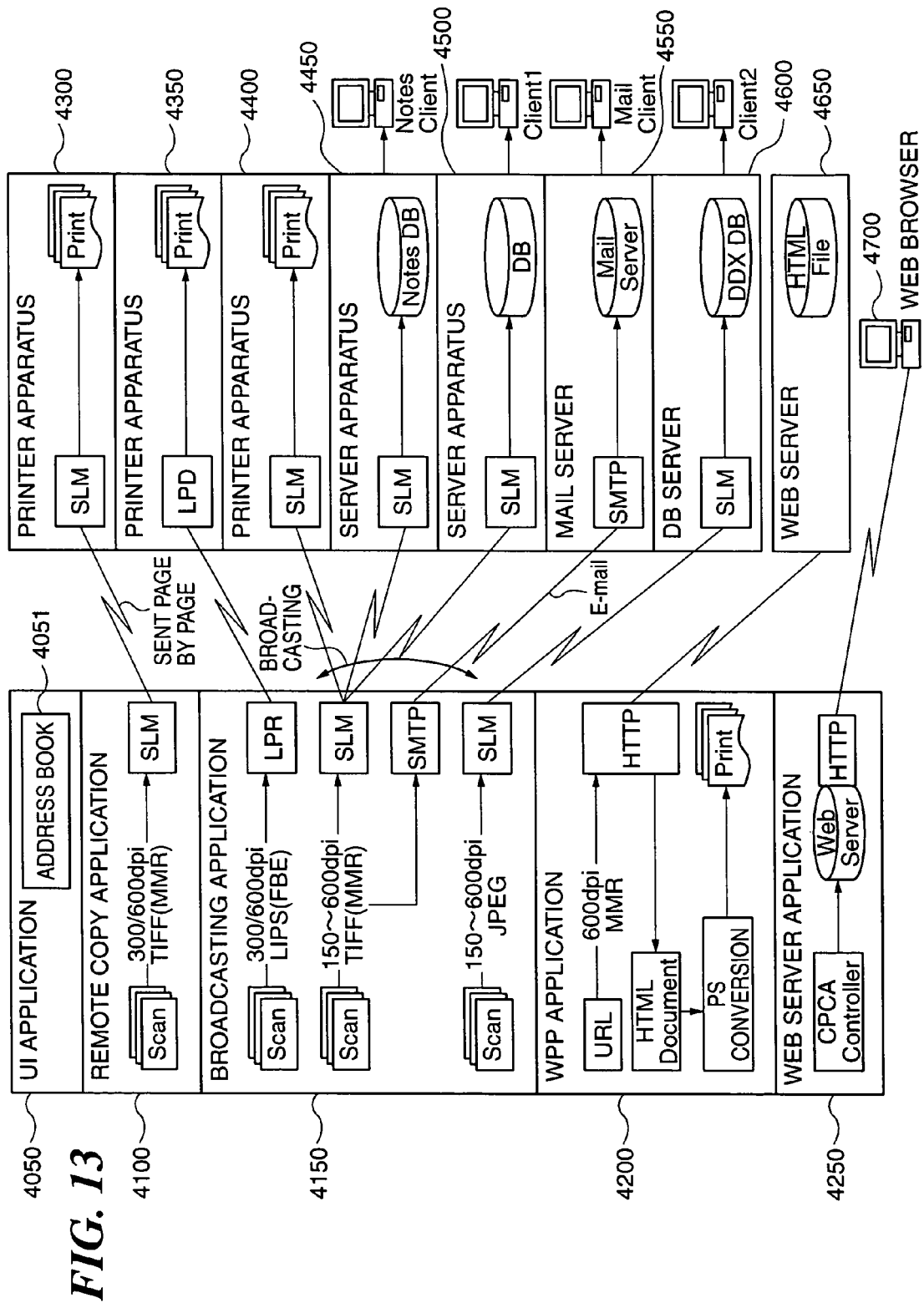
FIG. 13 is a diagram showing the relationship between applications installed in the printer and communication counterpart devices which are associated with the respective applications.

FIG. 13 is a diagram showing the relationship between the applications installed in the printer 108 and communication counterpart devices, which are associated respectively with the applications. In FIG. 13, the applications installed in the printer 108 are shown on the left-hand side, while the communication counterpart devices are shown on the right-hand side.

In FIG. 13, reference numeral 4050 is a UI application which includes an address book 4051.

Reference numeral 4100 designates a remote copy application (sender side).

Reference numeral 4150 designates a broadcasting application (sender side).

Reference numeral 4200 designates a WPP (Web Pull Print) application.

Reference numeral 4250 designates a Web server application.

Reference numeral 4300 designates a printer apparatus as a recipient associated with the remote copy application 4100, for performing printing.

Reference numeral 4350 designates a general printer device that receives image data transmitted from the broadcasting application 4150, for performing printing.

Reference numeral 4400 designates a printer apparatus that receives image data transmitted from the broadcasting application 4150, for performing printing. This printer apparatus 4400 is a recipient (printing side) of the remote printing.

Reference numeral 4450 designates a server apparatus, more specifically a notes servers, that receives image data transmitted from the broadcasting application 4150, for storage therein.

Reference numeral 4500 designates a server apparatus that receives image data transmitted from the broadcasting application 4150, and stores the same as binary data.

Reference numeral 4550 designates a mail server that receives image data transmitted from the broadcasting application 4150, for storage therein.

Reference numeral 4600 designates a DB server that receives image data transmitted from the broadcasting application 4150, and stores the same as multivalued data.

Reference numeral 4650 designates a Web server that receives information contents transmitted from the WPP application 4200, for storage therein.

Reference numeral 4700 designates a Web browser that accesses the Web server application 4250.

The UI application 4050 corresponds to the aforementioned UI module 1501, and the address book 4051 corresponds to the aforementioned address book 1502.

The address book 4051 is stored in a non-volatile storage device (non-volatile memory, hard disk, or the like) of the printer 108, and contains entries of properties of a plurality of communication counterpart devices connected to the network. For example, the entries include the following:

Formal name and alias name of each apparatus or device
Network address of the same
Network protocol(s) compatible with the same
Document format(s) compatible with the same
Compression type(s) compatible with the same
Image resolution(s) compatible with the same
Size(s) of feedable sheets and information on feeder stage(s), when the apparatus is a printer apparatus,
Name of a folder that can store documents when the apparatus is a server (computer) apparatus Applications described hereinafter each determine the properties of a recipient (counterpart apparatus or device) from the information of entries of the address book 4051. Further, the address book 4051 can be edited, and information collected and stored in a server computer on the network may be downloaded for use as the information of entries. Further, the information of entries may be collected by directly accessing each recipient (counterpart apparatus or device).

The remote copy application 4100 acquires information of resolutions compatible with an apparatus or device designated as a recipient from the address book 4051, and according to the information, reads binary image data using the scanner unit 2070, compresses the image data by MMR compression, converts the compressed image into TIFF (Tagged Image File Format) data, and sends the TIFF data to the printer apparatus 4300 on the network by SLM, which is a kind of network protocol including device control information called Salutation Manager (or Smart Link Manager), though not described in detail here.

As is distinct from the remote copy application 4100, the broadcasting application 4150 sends image data to a plurality of recipients, per each image scanning operation. The recipients are not limited to printer apparatuses, but this broadcasting application 4150 can also directly send image data to so-called server computers.

Hereafter, a description will be given on a recipient type-by-recipient type basis.

When determining with reference to the address book 4051 that the recipient apparatus is compatible with LPD (Line Printer Daemon) as a network printer protocol, and LIPS as a printer control command, the broadcasting application 4150 also performs reading of image data according to an image resolution also acquired by referring to the address book 4051, compresses the image data using FBE (First Binary Encoding), further converts the compressed image data into LIPS code data, and sends the resulting data to the recipient printer apparatus 4350 by LPR as a network printer protocol.

When determining with reference to the address book 4051 that the recipient apparatuses are server apparatuses compatible with SLM, the broadcasting application 4150 further refers to the address book 4051 to determine server addresses and designated folders of the respective servers, and similarly to the remote copy application 4100, reads binary image data using the scanner unit 2070, compresses the image data by MMR compression, converts the compressed image into TIFF data, sends the TIFF data to the server apparatuses 4450 and 4500 on the network by SLM, for storage in specified folders.

When determining with reference to the address book 4051 that the recipient apparatus is a server apparatus compatible with multivalued data compressed by JPEG, the broadcasting application 4150 compresses the read multivalued image data by JPEG, similarly to the binary image, converts the compressed image into JFIF data, sends the JFIF data to the server apparatus 4600 on the network by SLM, for storage in a specified folder.

Further, when determining with reference to the address book 4051 that the recipient apparatus is a mail server, the broadcasting application 4150 further refers to the address book 4051 to acquire a mail address, reads binary image data using the scanner unit 2070, compresses the binary image data by MMR compression, converts the compressed image into TIFF data, sends the TIFF data to the mail server 4550 using SMTP (Simple Mail Transfer Protocol). The distribution of the image data is executed thereafter by the mail server 4550.

The WPP application 4200 and Web server application 4250 are no directly concerned with the present embodiment, and therefore description thereof is omitted.

Incidentally, the controller unit 2000 (see FIG. 2) defines databases that store values set to jobs, functions of devices (scanner unit 2070, printer unit 2095, etc.), statuses, billing information, and so forth, in the form of data conforming to the control API 1518, and interfaces with the databases, as a Device Information Service (hereinafter referred to as "the DIS").

Figure 14:
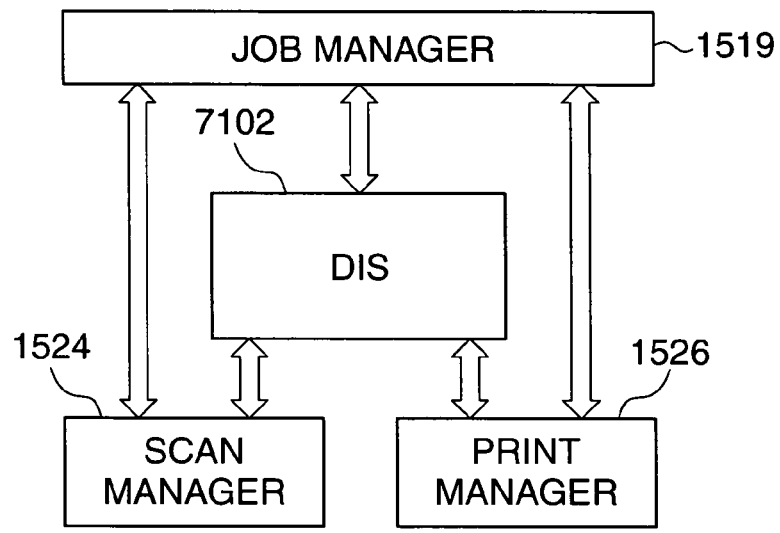
FIG. 14 is a diagram which is useful in explaining exchange of information between a DIS, a job-manager, a scan manager, and a print manager.

FIG. 14 is a diagram which is useful in explaining exchange of information between the DIS 7102, the job manager 1519, the scan manager 1524, and the print manager 1526.

Basically, dynamic information, such as job start commands, is directly issued from the job manager 1519 to the scan manager 1524 and the print manager 1526, whereas static information, such as the functions of devices and contents of jobs, is sent from the job manager 1519 via the DIS 7102 to the scan manager 1524 and the print manager 1526. Static and dynamic information from the scan manager 1524 and the print manager 1526, and events are transmitted via the DIS 7102 to the job manager 1519.

When the setting of data to or the acquisition of information from each database of the DIS 7102 is executed from the scan manager 1524 and the print manager 1526, since the data format of the database of the DIS 7102 conforms to the control API 1518, there is carried out processing for conversion between the data format conforming to the control API and a data format which can be dealt with by the scan manager 1524 and the print manager 1526, respectively. For example, when the scan manager 1524 and the print manager 1526 set respective status data to a database in the DIS 7102, the status data, which are peculiar to the respective devices, are interpreted and converted to compatible data defined based on the control API 1518, and then written into the database.

When the setting of data to or the acquisition of information from any of the databases in the DIS 7102 is executed from the job manager 1519, no data conversion is performed between the job manager 1519 and the DIS 7102.

Further, the DIS 7102 updates event data based on information of various events notified from the scan manager 1524 and the print manager 1526.

Figure 15:
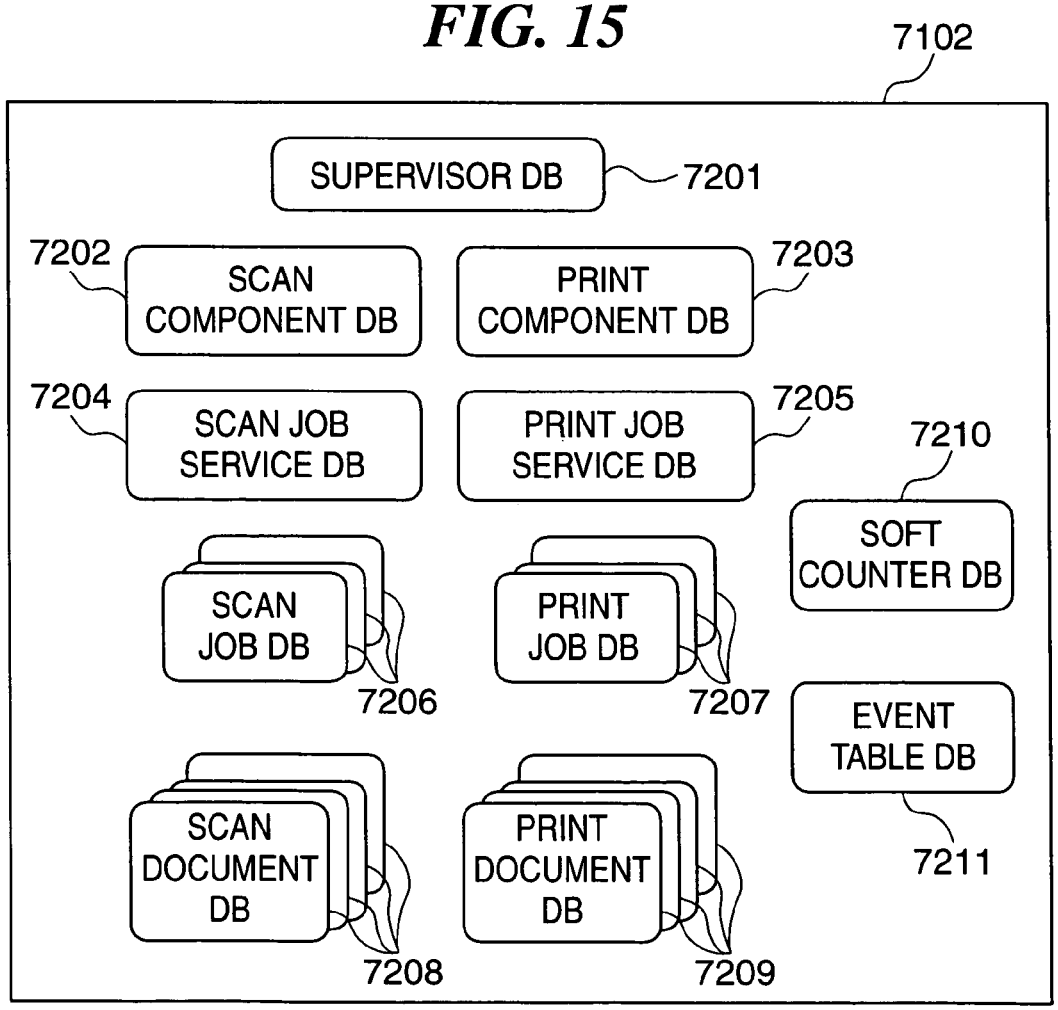
FIG. 15 is a diagram useful in explaining various databases stored in the DIS.

FIG. 15 is a diagram useful in explaining various databases stored in the DIS 7102. In FIG. 15, rectangular blocks with rounded corners represent individual databases (DB). Now, a description will be given of each database.

Reference numeral 7201 designates a supervisor DB, which stores statuses and user information on all the counterpart apparatuses. Information which needs to be backed up, such as user IDs and passwords, is stored in a non-volatile storage device, such as a hard disk and a back-up memory.

Reference numeral 7202 designates a scan component DB, and 7203 a print component DB. These component DBs are provided in association with the counterpart apparatuses. For example, if the counterpart apparatuses are printers alone, only the print component DB is provided. Further, if the counterpart apparatuses, a FAX component DB is provided, though not shown. When the component DBs are initialized, the scan manager 1524, the print manager 1526, and so forth, which are associated with the component DBs, respectively, set the functions and statues of the apparatuses to the respective component DBs.

Reference numeral 7204 designates a scan job service DB, 7205 a print job service DB. When these job service DBs are initialized, similarly to the component DBs, the scan manager 1524, the print manager, and so forth, which are associated with the job service DBs, respectively, set the functions that can be used by the apparatuses, and support statuses of the apparatuses, to the respective component DBs.

Next, a description will be given of the JOB DBs and the document DBs.

Reference numeral 7206 designates a scan job DB, 7207 a print job DB, 7208 a scan document DB, and 7209 a print document DB.

The job DBs and the document DBs are dynamically secured and initialized by the job manager 1519 whenever a job and a document involved in the job are generated to thereby set the necessary items to the DBs. Before starting processing of a job, the scan manager 1524, the print manager 1526, and so forth read out the necessary items for the processing, from the job DB and the document DB associated therewith to start the job. Then, after completion of the job, the DB associated with the job and the document involved in the job are set free. One job has at least one document, and therefore, a plurality of document DBs are sometimes secured for a certain job.

Reference numeral 7211 designates an event table DB that stores event information notified by the scan manager 1524, the print manager 1526, etc., and reference numeral 7210 a soft counter DB for recording the number of times of scanning, and the number of times of printing.

The events notified by the scan manager 1524 include a state transition of each component, completion of a scanning operation, and various errors, and the events notified by the print manager 1526 include a state transition of each component, completion of a printing operation, jamming, an open state of a feeder cassette, and so forth, with event IDs being defined in advance for discriminating between the events.

When an event is issued from the scan manager 1524 or the print manager 1526, the DIS 7102 registers the event ID of the issued event, and detailed data accompanying the event, if necessary, in the event table DB 7211. Further, when cancellation of an event is notified by the scan manager 1524 or the print manager 1526, event data of the event which has been designated to be canceled is deleted from the event table DB 7211.

When polling of an event is performed by the job manager 1519, the DIS 7102 refers to the event table DB 7211, and sends back the event ID of an event currently occurring, and data of details accompanying the event, if necessary, to the job manager 1519, whereas if no event is occurring, information to that effect is sent back to the job manager 1519.

Further, when an event of completion of a scanning operation or an event of completion of a printing operation is notified, the counter value of a user who performed scanning or printing is updated by software. The counter value updated by software is written into a non-volatile storage device, such as a back-up memory device and a hard disk, whenever the value is updated, so as to prevent the value from being lost due to unexpected shutdown of the power.

Next, a detailed description will be given of the scanning operation.

Figure 16:
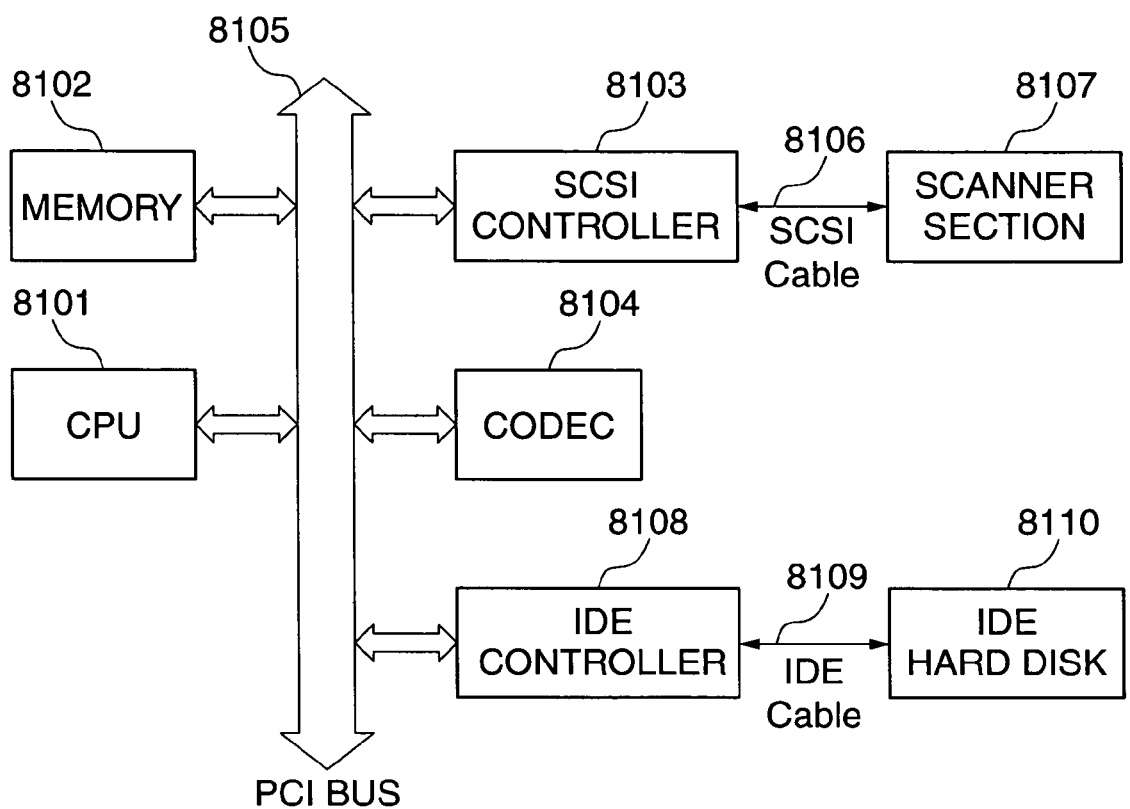
FIG. 16 is a block diagram showing the hardware configuration of a control section provided in the scanner appearing in FIG. 2, for controlling the operation of the scanner.

FIG. 16 is a block diagram showing the hardware configuration of a control section provided within the scanner unit 2070 appearing in FIG. 2, for controlling the operation of the scanner unit 2070.

In FIG. 16, a CPU 8101, a memory 8102, a SCSI controller 8103, an image compression and expansion board (CODEC) 8104, and an IDE controller 8108 are connected to a PCI bus 8105. Connected to the SCSI controller 8103 is a scanner section 8107 via a SCSI interface cable 8106, and the SCSI controller 8103 provides an interface for connecting the scanner section 8107 to the PCI bus 8105. Further, connected to the IDE controller 8108 is an IDE hard disk 8110 via an IDE cable 8109.

Figure 17:
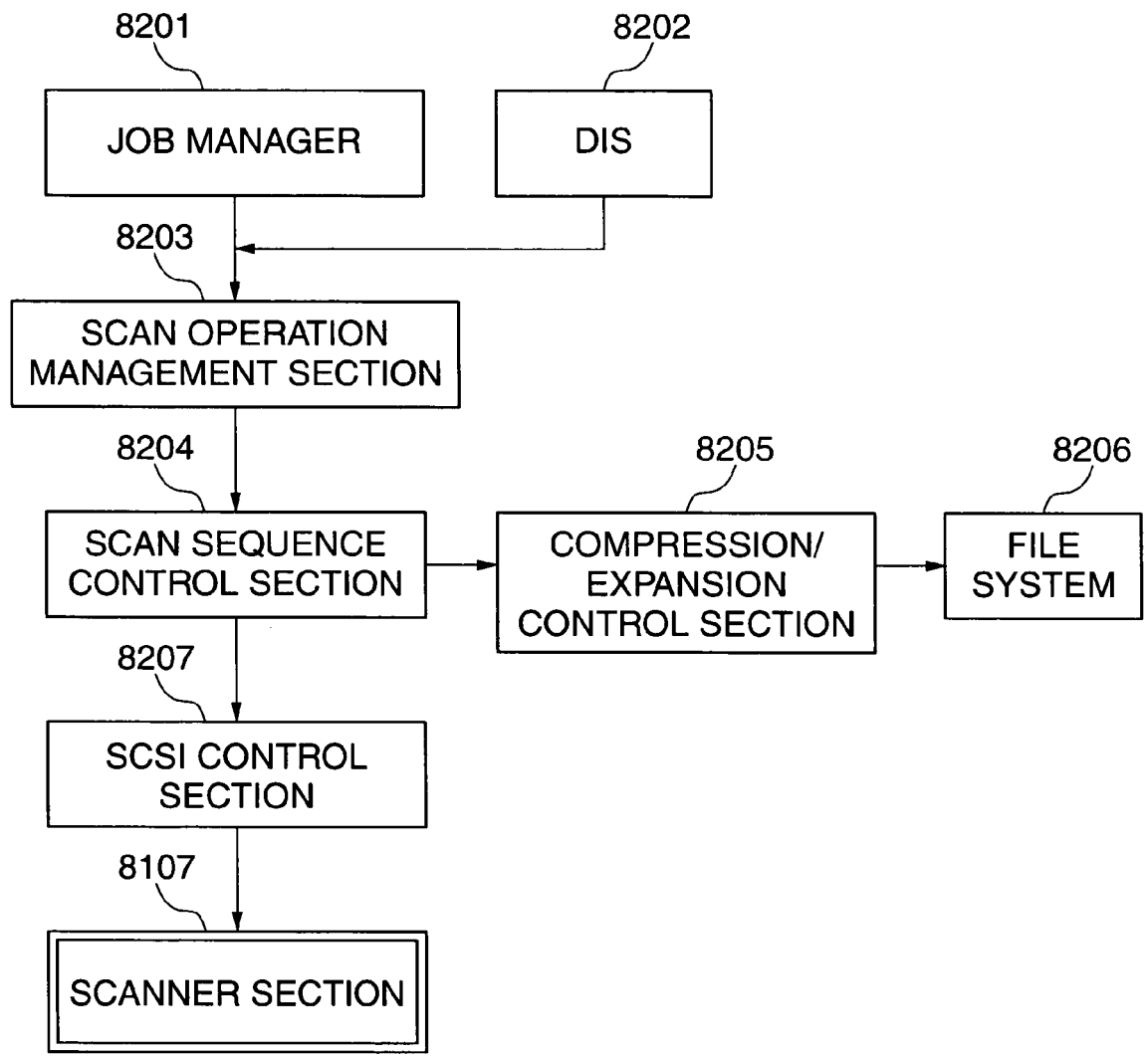
FIG. 17 is a block diagram showing the software configuration of software programs stored in a memory and executed by a CPU, for controlling the operation of the scanner.

FIG. 17 is a block diagram showing the software configuration of software programs stored in the memory 8102 and executed by the CPU 8101, for controlling the operation of the scanner unit 2070.

A job manager 8201 has a function of classifying and storing requests at the application level. A DIS 8202 stores parameters necessary for a scanning operation at the application level. Requests from applications are stored in the memory 8102 appearing in FIG. 16.

A scan operation management section 8203 acquires information necessary for performing scanning from the job manager 8201 and the DIS 8202. More specifically, the scan operation management section 8203 receives table data comprised of a job number and a document number from the job manager 8201, and then scan parameters corresponding to the table data from the DIS 8202. Based on the scan parameters as scanning requirements of the application, the scanning operation is carried out.

Figure 18:
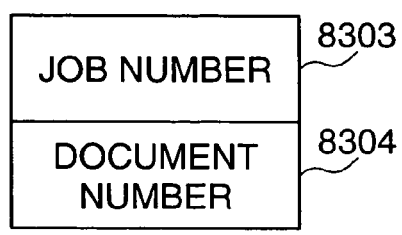
FIG. 18 is a diagram showing the format of table data that a scan operation management section receives from the job manager.
Figure 19:
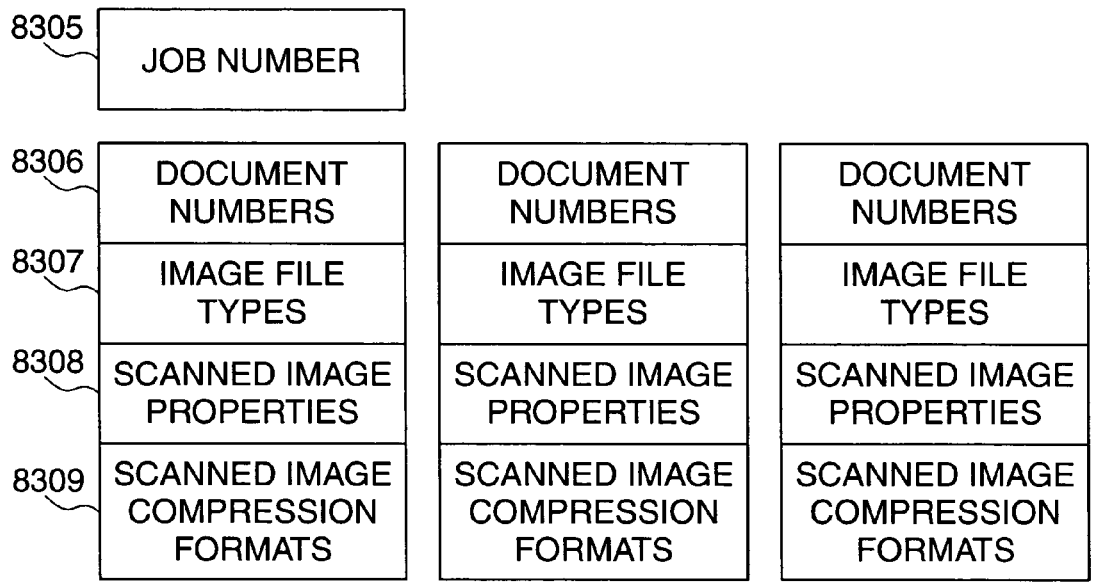
FIG. 19 is a diagram useful in explaining scan parameters stored in the DIS.

FIG. 18 is a diagram showing the format of the table data that the scan operation management section 8203 receives from the job manager 8201. The table data is comprised of a job number 8303 and a document number 8304. FIG. 19 is a diagram useful in explaining the scan parameters stored in the DIS 8202. The scan parameters include a job number 8305, document numbers 8306, image file types 8307, scanned image properties 8308, and scanned image compression formats 8309.

Referring again to FIG. 17, the scan operation management section 8203 sends the scan parameters acquired from the DIS 8202 to a scan sequence control section 8204 in the order of document numbers. The scan sequence control section 8204 having received the scan parameters controls a SCSI control section 8207 according to the contents of the scanned image properties 8308. This causes the SCSI controller 8103 appearing in FIG. 16 to operate, whereby a SCSI control command is sent to the scanner section 8107 via the SCSI interface cable 6, to thereby perform scanning.

Image data obtained by the scanning is sent from the scanner section 8107 in FIG. 16 to the SCSI controller 8103 via the SCSI interface cable 6, and stored in the memory 8102 via the PCI bus 8105.

At a time point the scanning is completed and the image data is stored in the memory 8102, the scan sequence control section 8204 makes a request to a compression and expansion control section 8205 so as to compress the scanned image stored in the memory 8102 according to the contents of a designated one of the scanned image compression formats 8309 of the scan parameters. Upon reception of the request, the compression and expansion control section 8205 performs compression of the scanned image using the CODEC 8104 shown in FIG. 16 according to the designated scanned image compression format 8309. The compression and expansion control section 8205 stores the compressed image data in the memory 8102 via the PCI bus 8105.

At a time point the compression and expansion control section 8205 compresses the scanned image according to the designated scanned image compression format 8309 and stores the compressed scanned image in the memory 8102, the scan sequence control section 8204 forms the compressed scanned image data stored in the memory 8102 into a file according to a designated one of the image file types 8307 of the scan parameters. More specifically, the scan sequence control section 8204 requests the file system 8206 to form the compressed scanned image data into a file according to a file format of the designated image file type 8307 of the scan parameters.

The file system 8206 forms the compressed image data stored in the memory 8102 into a file according to the image file type 8307, and transfers the file to the IDE controller 8108 via the PCI bus 8105 shown in FIG. 16. The file of the image data is further transferred to the IDE hard disk 8110 via the IDE cable 8109, and stored in the IDE hard disk 8110. At a time point the file system 8206 stores the file of the image data in the IDE hard disk 8110, the scan sequence control section 8204 sends back to the scan operation management section 8203 a scan completion notification to the effect that processing of one page of an original on the scanner section 8107 is completed.

At this time point, if there remains an original yet to be scanned on the scanner section 8107, and at the same time a scan request is sent from the job manager 8201, the scan operation management section 8203 makes a request again to the scan sequence control section 8204 using the scan parameters stored in the DIS 8202 to perform a scan operation.

On the other hand, if there remains no original yet to be scanned on the scanner section 8107, or no scan request is sent from the job manager 8201, the scan operation management section 8203 judges that the scan operation is completed, and issues a scan completion notification to the job manager 8201.

Next, a detailed description will be given of the printing operation.

Figure 20:
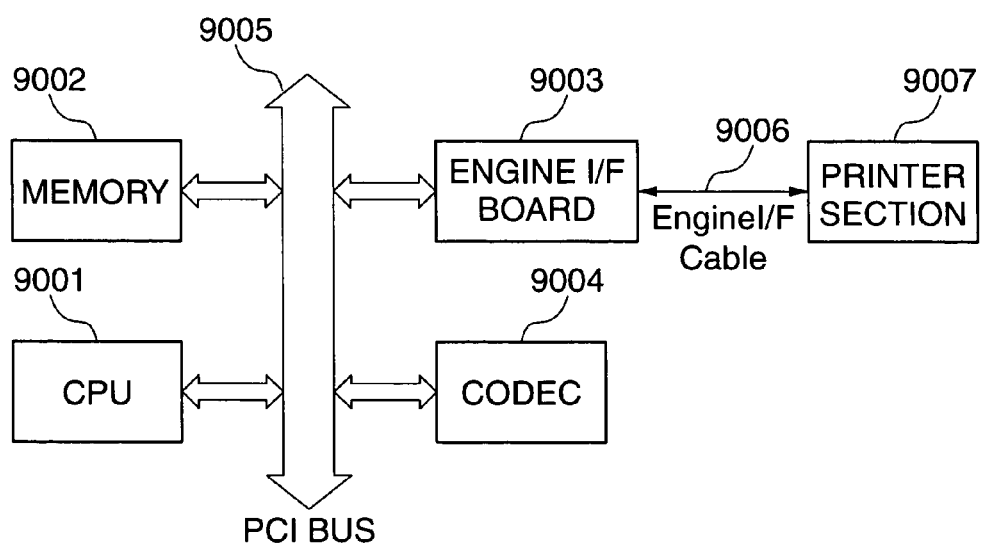
FIG. 20 is a block diagram showing the hardware configuration of a control section provided in the printer appearing in FIG. 2, for controlling the operation of the printer.

FIG. 20 is a block diagram showing the hardware configuration of a control section provided within the printer unit 2095 appearing in FIG. 2, for controlling the operation of the printer unit 2095.

As shown in FIG. 20, a CPU 9001, a memory 9002, an image compression expansion board (CODEC) 9004, and an engine I/F board 9003 are connected to a PCI bus 9005. A printer section 9007 is connected to the engine I/F board 9003 via an engine interface cable 9006.

The engine I/F board 9003 has a DPRAM provided therein, and performs, via the DPRAM, setting of parameters to the printer section 9007 and reading of status information from the same as well as sending and receiving control commands to and from the same. Further, the engine I/F board 9003 has a video controller and transmits image data loaded on the PCI bus 9005 to the printer section 9007 via the engine interface cable 9006 in synchronism with a signal VCLK (Video Clock) and a signal HSYNC received from the printer section 9007 via the engine interface cable 9006.

Figure 21:
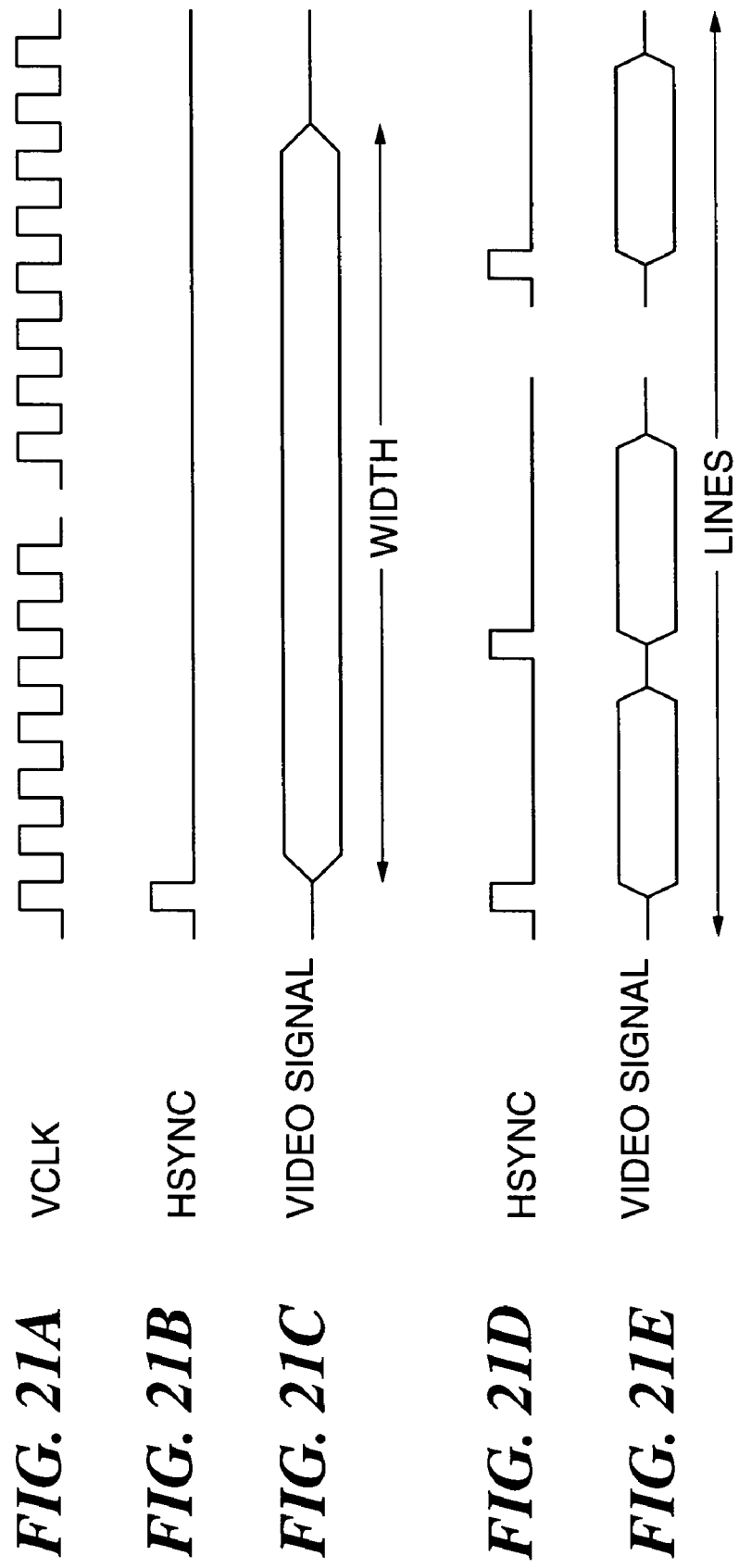
FIG. 21 is a timing diagram showing the relationship between a signal VCLK and a signal HSYNC, and image data (video signals)

FIG. 21 is a timing diagram showing the relationship between the signal VCLK (source signal), signals HSYNC (source and printing process signals), and source and print image data (video signals).

As shown in FIG. 21, the signal VCLK is constantly generated, and the printing process signal HSYNC is generated in synchronism with the start of printing one line of image data at the printer section 9007. The video controller reads out the print image data from the source image data in an amount corresponding to a preset image width (WIDTH) from the memory 9002, and delivers the print image data as the video signal to the printer section 9007 via the engine interface cable 9006. After repeating this operation for a designated number of lines (LINES), a command IMAGE_END, referred to hereinafter, is generated.

As described hereinbefore, when a print job is instructed from an application program operating on the CPU 2001 to the control API 1518 appearing in FIG. 12, the control API 1518 passes the print job to the job manager 1519. The job manager 1519 stores the settings of the job in the DIS 7102 in FIG. 14, and instructs the start of the job to the print manager 1526. Upon receipt of the job, the print manager 1526 reads out information necessary for execution of the job from the DIS 7102, and causes the engine I/F board 9003 and the printer section 9007 appearing in FIG. 20 to execute printing.

Figure 22:
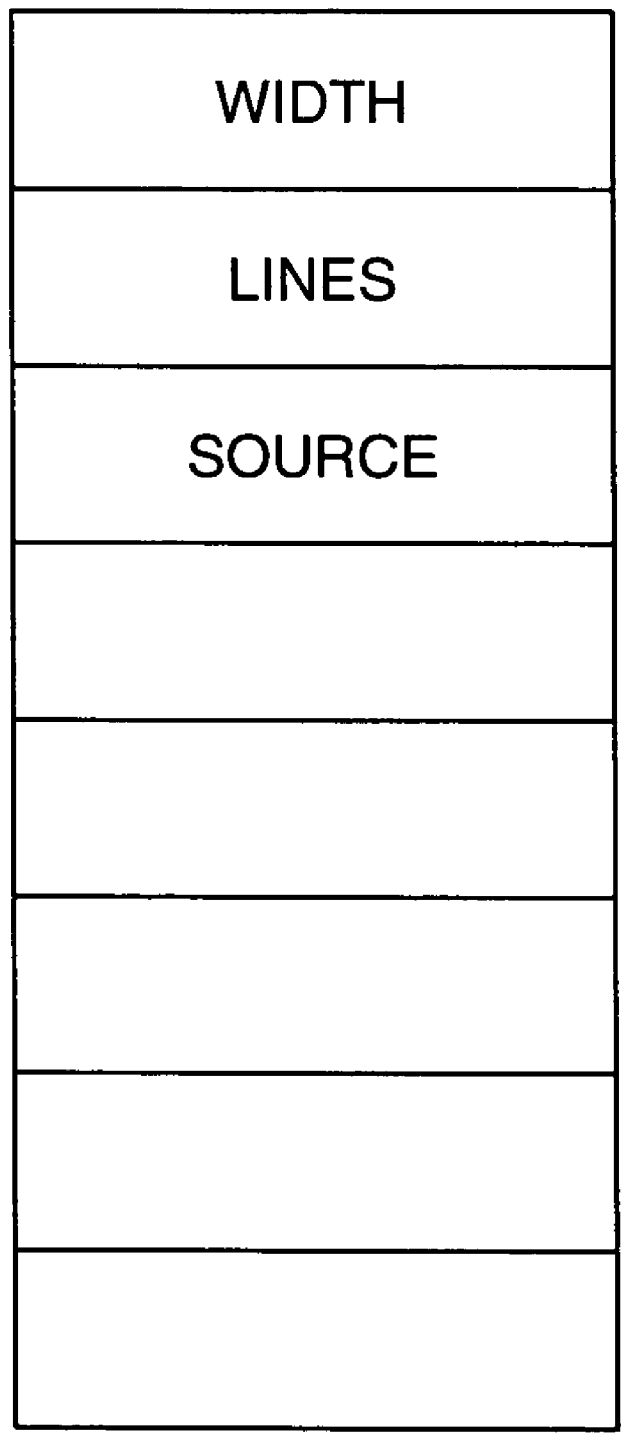
FIG. 22 is a diagram useful in explaining print parameters set in an engine I/F board.
Figure 23:
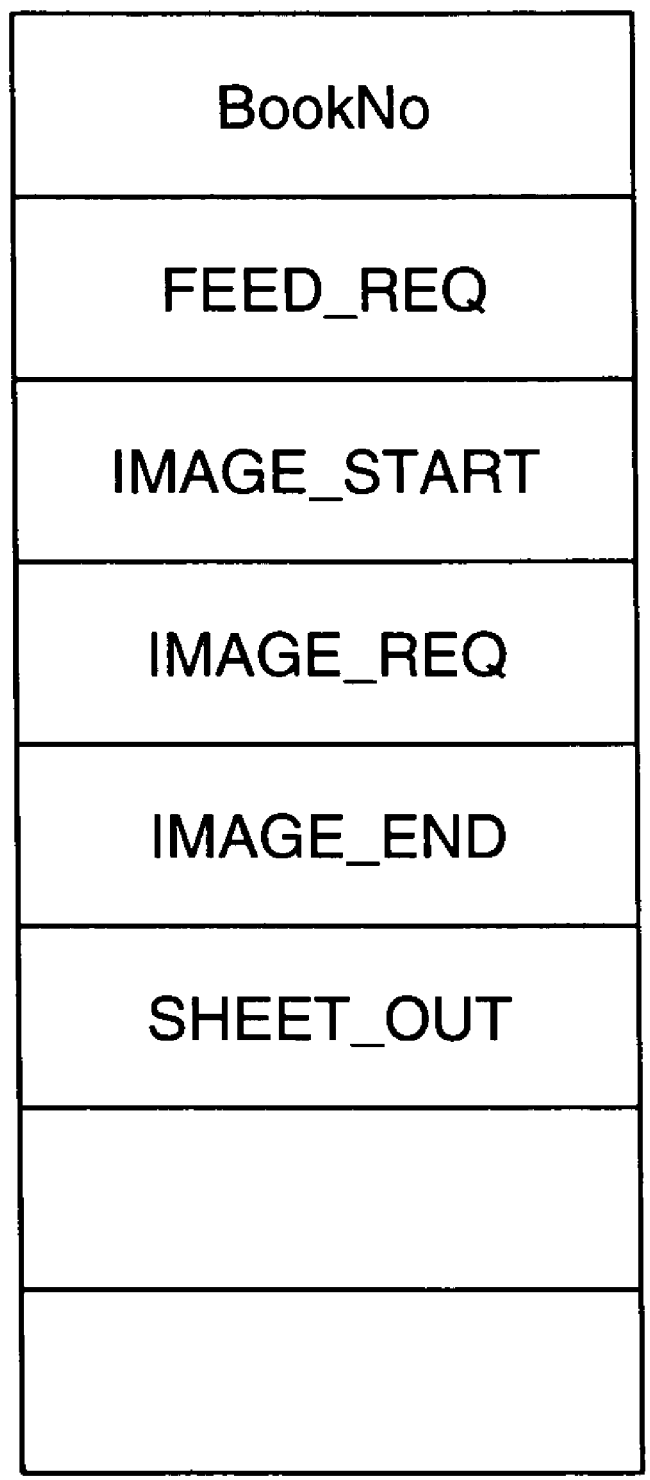
FIG. 23 is a diagram which is useful in explaining control commands and status commands transmitted and received between a printer section and the engine I/F board.

A specific example of the above operation will be described hereinbelow. FIG. 22 shows print parameters set in the engine I/F board, and FIG. 23 shows the control commands and status commands transmitted and received between the printer section 9007 and the engine I/F board 9003, both the parameters and the commands being stored in the DPRAM within the engine I/F board 9003.

Hereafter, for simplicity of description, it is assumed that a print job executed here is defined by the conditions of non-compression, a letter size (11 inches×8.5 inches), binary image, and one copy of two pages for printing, with a resolution of the printer section 9007 being set to 600 dpi.

First, the print manager 1526 having received the print job calculates the number of bytes WIDTH in the transverse direction of the print image (8.5 inches in this case).

WIDTH=8.5×600÷8≈630 (bytes)

Next, the number of lines LINES in the longitudinal direction is calculated.

LINES=11×600=6600 (bytes)

The calculated values and a given address SOURCE in the memory 9002 at a location where image data of a first page is stored are stored in respective associated portions of the print parameters shown in FIG. 22 and stored in the DPRAM. At this time point, the engine I/F board 9003 is ready for outputting the image, but since the printing process signal HSYNC has not been supplied from the printer section 9007 yet (the signal VCLK has already been supplied), print image data is not outputted to the printer section 9007.

Next, the print manager 1526 writes an output number of 1 in an area within the DPRAM corresponding to a command BookNo (see FIG. 23). Then, a request for feeding an output sheet for the first page (i.e. command FEED_REQ) is issued, and a command IMAGE_REQ sent from the printer section 9007 is awaited. Upon supply of the command IMAGE_REQ from the printer section 9007, a command IMAGE_START is delivered to the printer section 9007. When the printer section 9007, upon receipt of the command IMGE_START, outputs the printing process signal HSYNC, the engine I/F board 9003, which has been waiting for the supply of the printing process signal HSYNC, delivers the image data to the printer section 9007, to thereby start printing.

Then, when detecting the trailing end of the output sheet, the printer section 9007 delivers the command IMAGE_END, and when the output sheet is discharged, the same delivers a command SHEET_OUT. After receiving the command IMAGE_END for the first page, the print manager 1526 sets the setting values WIDTH, LINES, and SOURCE for a second page to the engine I/F board 9003, and delivers the command FEED_REQ to the printer section 9007, to wait for the supply of the command IMAGE_REQ. The print manager 1526, upon receipt of the command IMAGE_REQ for the second page from the printer section 9007, performs the same operation as performed for the first page.

Next, a description will be given of high-speed recovery from a power saving mode according to the present invention.

Figure 24:
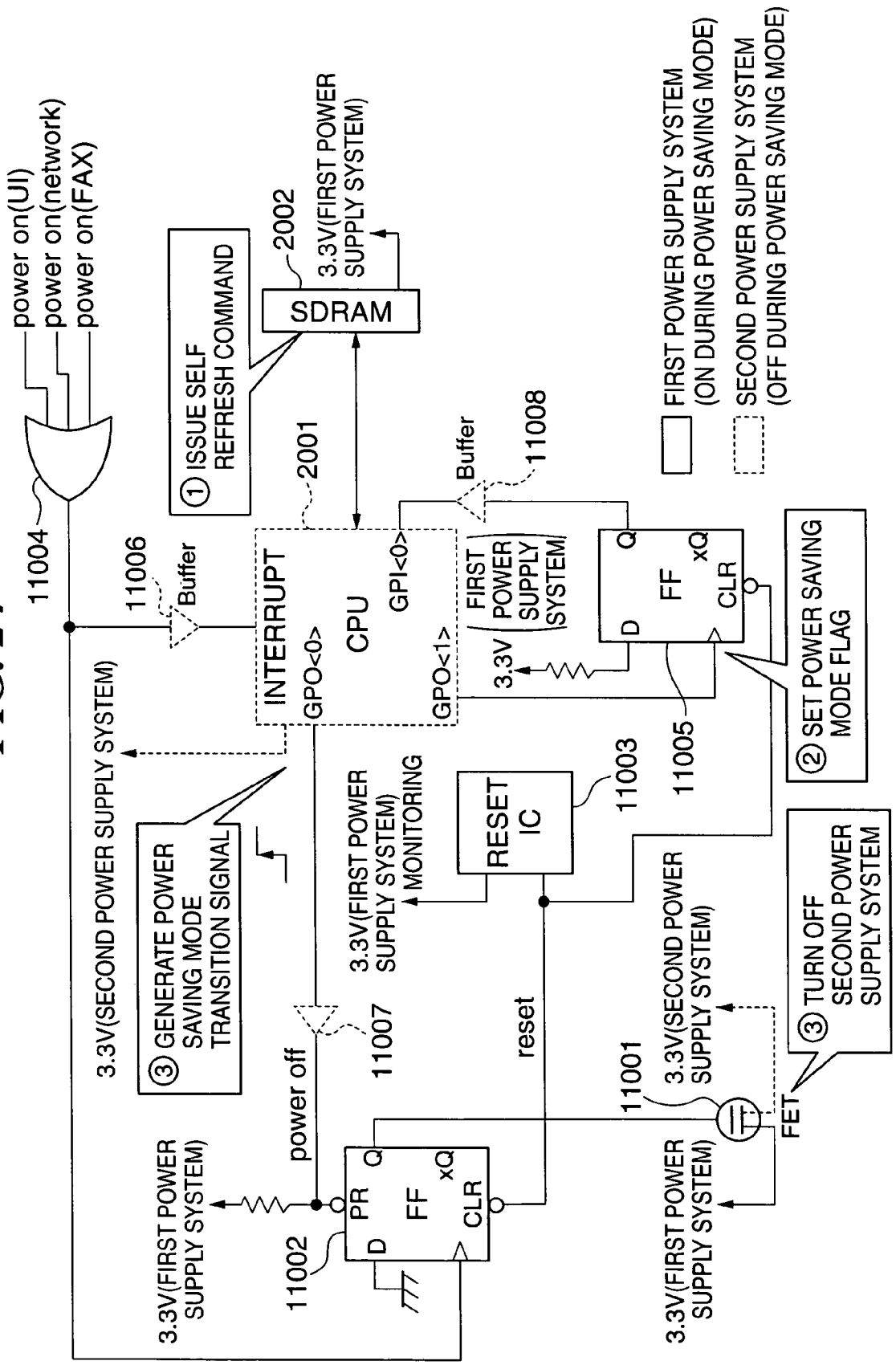
FIG. 24 is a diagram showing the arrangement of a main part and a circuit for a power saving mode operation of the controller unit, in which a sequence of control operations of the controller unit during transition to a power saving mode are explicitly shown.
Figure 25:
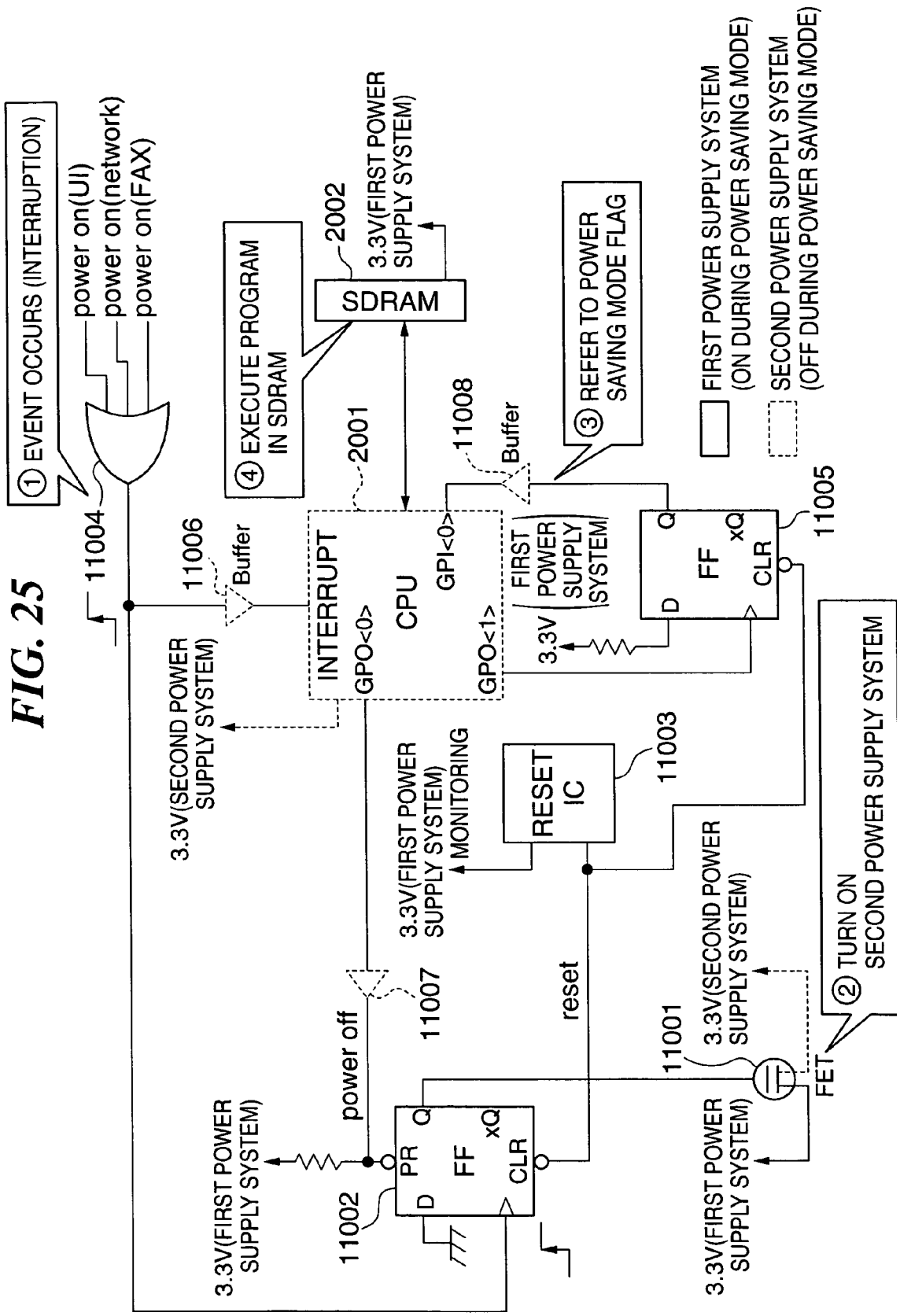
FIG. 25 is a diagram showing the arrangement of the main part and the circuit for the power saving mode operation of the controller unit, in which a sequence of control operations of the controller unit during recovery from the power saving mode are explicitly shown.
Figure 26:
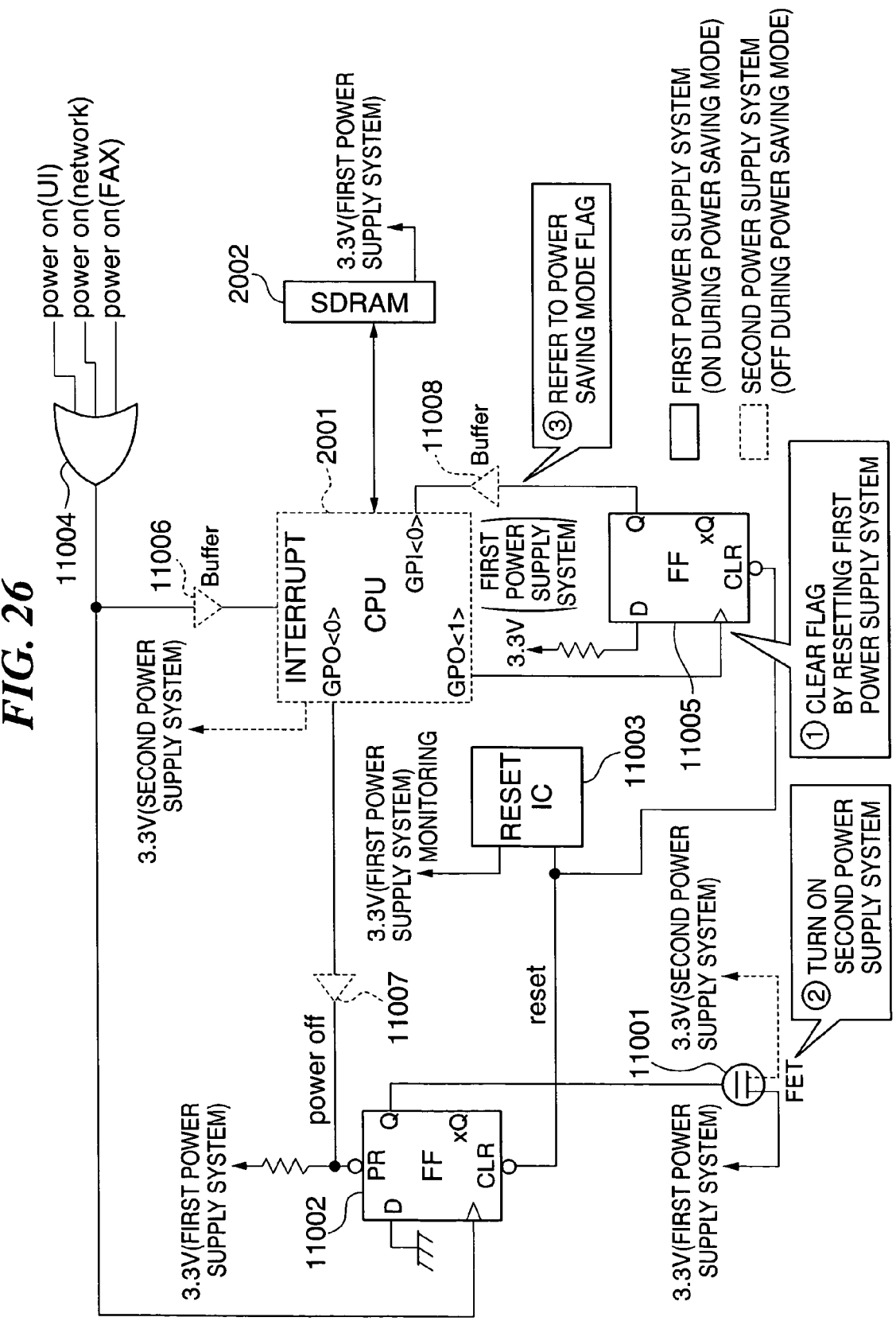
FIG. 26 is a diagram showing the arrangement of the main part and the circuit for the power saving mode operation of the controller unit, in which a sequence of control operations of the controller unit performed when a user turns on a main power supply from an OFF state thereof to start the printer are explicitly shown.

FIGS. 24 to 26 are diagrams showing a main part and a circuit necessary for the power saving mode operation of the controller unit 2000. Solid lines and broken lines in FIGS. 24 to 26 are for discrimination between components driven by a first power supply system and those driven by a second power supply system. The first power supply system supplies power (continues to be ON) even after the printer 108 has been switched to the power saving mode, and the second power supply system is separated from the first power supply system to stop supply of power (turns OFF) when the printer 108 has shifted to the power saving mode.

In FIGS. 24 to 26, a FET 11001 serves to disconnect the first power supply system from the second power supply system. When the printer 108 has been switched to the power saving mode, the second power supply system is disconnected from the first power supply system, to inhibit the power from being supplied to other parts than the main part of the controller unit 2000 (which at least needs to be supplied with power), whereby the wasteful standby-power is reduced. Although not shown in FIGS. 24 to 26, the ROM 2003 appearing in FIG. 2 is supplied with power from the first power supply system, and the HDD 2004 is supplied with power from the second power supply system.

The present invention is characterized in that the CPU 2001 which generally consumes higher power than the other components of the controller unit 2000 is supplied with power from the second power supply system, whereby the CPU 2001 is on standby during the power saving mode with no power being supplied thereto, and at the same time, when it is necessary to recover the power due to an external cause, the controller unit 2000 can recover the power supply state by itself.

More specifically, the printer 108 has the multiple functions as described hereinabove, and accordingly extensive software is required for controlling the functions. To avoid an increase in the total cost of the controller unit 2000 due to the software being extensive, only information (boot program) necessary for booting the system is stored in the ROM 2003 shown in FIG. 2, and on the other hand, software for causing the printer 108 to execute main operations is stored in the HDD 2004 which is mainly used to store image information. As a result, when the main power is turned on as usual, a main program, which is large in size and stored in the HDD 2004, is first downloaded into the RAM 2002 (SDRAM 2002 in the example illustrated in FIGS. 24 to 26), and then executed. In this case, it takes time before the main program starts to be executed, and therefore there is a fear that when executing the printing process based on data transmitted by network communication, facsimile communication, or the like, the communication may time out.

Further, in recent digital multifunction machines, a short required starting time is often featured as one of selling points in the specifications thereof, and from this viewpoint as well, it is necessary to provide a means for reducing the required starting time for the start of the system. As a solution to this problem, the present invention provides an inexpensive logic circuit shown in FIGS. 24 to 26.

FIG. 24 is a diagram showing the arrangement of the main part and the circuit for the power saving mode operation of the controller unit, in which a sequence of control operations of the controller unit during transition to the power saving mode are explicitly shown.

As shown in FIG. 24, the CPU 2001 has a general output port GP0<1> to which is connected a clock input terminal of a flip-flop circuit (FF) 11005, and a general output port GP0<0> to which is connected a PR terminal of a flip-flop circuit (FF) 11002 via a buffer 11007. The PR terminal of the flip-flop circuit (FF) 11002 is supplied with 3.3 V voltage from the first power supply system. Connected to a clock input terminal of the flip-flop circuit (FF) 11002 is an output terminal of a logic OR gate 11004, and connected to a CLR terminal of the same is an output terminal of a reset IC 11003. Further, a D terminal of the flip-flop circuit (FF) 11002 is grounded, and a Q terminal of the same is connected to a gate terminal of the FET 11001. The FET 11001 turns off when a high-level signal is inputted to the gate terminal thereof to shut down the second power supply system.

An output terminal of the reset IC 11003 is connected to a CLR terminal of the flip-flop circuit (FF) 11005. The reset IC 11003 monitors the first power supply system, and when the printer 108 starts, i.e. when the first power supply system turns on from an off state (in which the main power of the printer 108 is off), the reset IC 11003 sends a reset signal (reset) to the CLR terminals of the flip-flop circuits (FF) 11002 and 11005 to thereby cause Q terminals of the same to go low.

A D terminal of the flip-flow circuit (FF) 11005 is supplied with 3.3 V voltage from the first power supply system, and a Q terminal of the same is connected to a general input port GPI<0> of the CPU 2001 via a buffer 11008.

The logic OR gate 11004 has input terminals thereof supplied with a power ON signal from the operating section 2012 (UI) in FIG. 2, a power ON signal received together with a print request from the network section 2010 in FIG. 2, and a power ON signal received together with a print request (facsimile transmission) from the MODEM 2050 in FIG. 2, while the output terminal of the logic OR gate 11004 is not only connected to the clock input terminal of the flip-flop circuit (FF) 11002 as mentioned above, but also connected to an interrupt terminal INTERRUPT of the CPU 2001 via a buffer 11006.

It should be noted that the buffers 11006 to 1108 are driven by the second power supply system, and when the printer 108 is switched to the power saving mode, the buffers 11006 to 11008 serve to block the flow of electric current from the first power supply system.

Next, a description will be given of a flow of control of the controller unit 2000 when the printer. 108 is switched to the power saving mode.

(1) When the user gives an instruction to enter the power saving mode via the operating section 2012 in FIG. 2, or when the printer 108 has not been in operation for not less than a predetermined time period, the CPU 2001 determines that the conditions for entering the power saving mode have been satisfied, and delivers a self-refresh command to the SDRAM 2002 to cause the same to preserve the main program.

(2) Then, the CPU 2001 causes the general output port GP0<1> to change its signal level from low (L) to high (H), whereby the output from the Q terminal of the flip-flop circuit (FF) becomes 1 (high), whereby a flag is set. The flip-flop circuit (FF) 11005 is driven by the first power supply system, as mentioned above, and therefore, even after entering the power saving mode, the value of this flag is preserved.

(3) Next, the CPU 2001 causes the signal level of the output from the general output port GP0<0> to be changed to thereby preset the signal level of the output from the Q terminal of the flip-flop circuit (FF) 11002 to a high (H) level. This turns off the FET 11001 to shut down the power from the second power supply system whereby the printer 108 enters the power saving mode. The power supply to the CPU 2001 is interrupted.

In this way, the transition to the power saving mode is controlled by the above-described sequence of control operations of the controller unit 2000.

FIG. 25 is a diagram showing the arrangement of the main part and the circuit for the power saving mode operation of the controller unit 2000, in which a sequence of control operations of the controller unit 2000 during recovery from the power saving mode are explicitly shown. Hereafter, a description will be given of the sequence of control operations executed by the controller unit 2000 when the printer 108 recovers from the power saving mode.

(1) While the printer 108 is on standby in the power saving mode, if there occurs an event demanding recovery of the printer 108 from the power saving mode, so that the power ON signal is inputted to the logic OR gate 11004, the power ON signal at a high level is inputted to the interrupt terminal INTERRUPT of the CPU 2001.

(2) On the other hand, the above power ON signal is also sent to the clock input terminal of the flip-flop circuit (FF) 11002, causing the signal level of the Q terminal output of the flip-flop circuit (FF) 11002 to go low (L). This turns on the FET 11001 to activate the second power supply system to start recovery from the power saving mode.

(3) The CPU 2001 thus supplied with the power from the second power supply system is booted to execute the boot program stored in the ROM 2003. The execution of the boot program causes the CPU 2001 to take in the output from the Q terminal of the flip-flop circuit (FF) 11005 via the general input port GPI <0>, namely, refers to the value of the flag set by the flip-flop circuit (FF) 11005.

(4) Since the value of the flag is 1, the CPU 2001 determines that the printer 108 is in the state recovered from the power saving mode. In this state, the main program is preserved in the SDRAM 2002 (stored when entering the power saving mode), and hence the CPU 2001 starts to execute the main program stored in the SDRAM 2002. Since the power ON signal at a high level (H) is inputted to the interrupt terminal INTERRUPT of the CPU 2001 as mentioned above, the CPU 2001, which is executing the main program, recognizes that some external factor has occurred which causes recovery of the printer 108 from the power saving mode, and determines which of turn-on of the power through operation of the operating section 2012 (UI), a print request from the network section 2010, and a print request (facsimile transmission) from the MODEM 2050 forms the factor, and carry out control according to the determined factor after the activation thereof.

FIG. 26 is a diagram showing the arrangement of the main part and the circuit for the power saving mode operation of the controller unit, in which a sequence of control operations of the controller unit 2000 performed when the user turns on the main power supply from an OFF state thereof to start the printer 108 are explicitly shown.

(1) When the main power supply to the printer 108 is turned on, the reset IC 11003 outputs the reset signal (reset) to the CLR terminal of the flip-flop circuit (FF) 11005 to clear the flag held by the flip-flop circuit (FF) 11005 to 0.

(2) Further, the reset IC 1103 outputs the reset signal (reset) to the CLR terminal of the flip-flop circuit (FF) 11002 to clear the output from the Q output terminal of the flip-flop circuit (FF) 11002, i.e. cause the same to go low. This turns on the FET 110001 to activate the second power supply system, and the CPU 2001 is booted to execute the boot program stored in the ROM 2003.

(3) The CPU 2001 having executed the boot program refers to the flag stored in the flip-flop circuit (FF) 11005. Since the value of the flag is 0 at this time, the CPU 2001 determines that the main power has been turned on from the off state, and in this case, downloads the main program from the HDD 2004 in FIG. 2 into the SDRAM 2002, and executes the main program.

Figure 30:
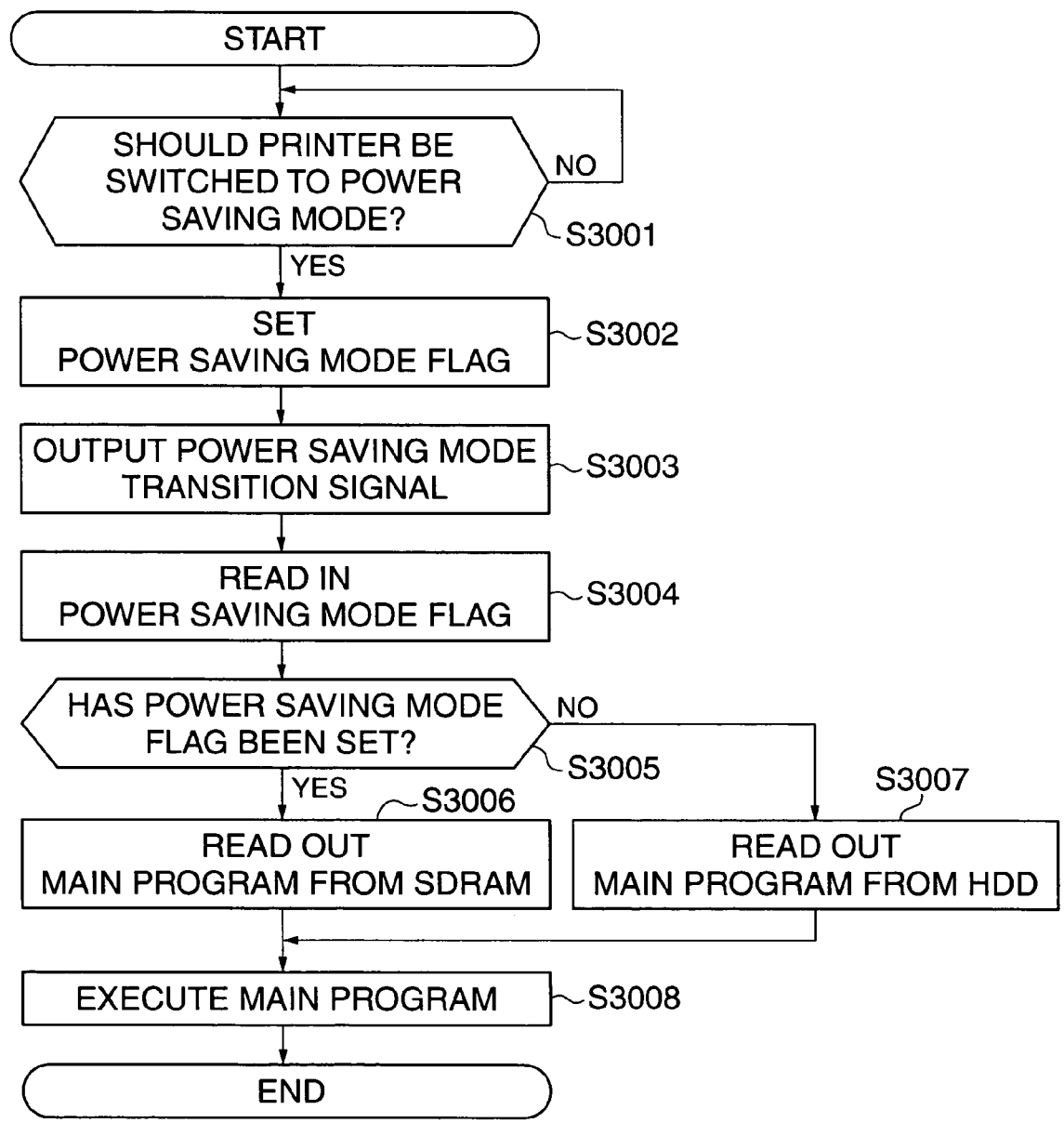
FIG. 30 is a flowchart showing a process executed by a CPU of a controller unit of an image processing apparatus according to a third embodiment of the present invention.

Now, a description will be given of the control operations executed by the CPU 2001 of the controller unit 2000 as shown in FIGS. 24 to 26, by also referring to FIG. 30.

In a step S3001, the CPU 2001 determines whether the printer 108 as the image processing apparatus should be switched from a state in which it is supplied with a normal power (normal operating mode) to a state in which it is supplied with a lower power (power saving mode) than the normal power. More specifically, when the user gives an instruction for causing the printer 108 to enter the power saving mode via the operating section 2012, or when the printer 108 has not been in operation for not less than a predetermined time period (when no print data has been received by the network section 2010 or when no facsimile data has been received by the MODEM 2050), the CPU 2001 determines that the printer 108 should be switched to the power saving mode, and the present process proceeds to a step S3002.

In the step S3002, to cause a signal indicative of a the printer 108 having entered the power saving mode to be held by the flip-flop circuit 11005, the CPU 2001 causes the signal level of the general output port GP0<1> to change from low (L) to high (H). This causes the signal level of the flip-flop circuit 11005 to become 1 (high) to thereby set the power saving mode flag.

In a step S3003, the CPU 2001 outputs a high-level signal (H) as a power saving mode transition signal from the general output port GP0<0> to the Q terminal of the flip-flop circuit 11002. This turns off the FET 11001 to shut down the power from the second power supply system to cause the printer 108 to enter the power saving mode. By shutting down the power from the second power supply system, the power supply to the CPU 2001 is interrupted.

In a step S3004, the CPU 2001 reads in the flag of the flip-flop circuit 11005 via the general input port GP1<0>. Although the power supply to the CPU 2001 is interrupted in the step S3003, when the step S3004 is executed, the power supply thereto has been resumed. This is because the FET 11001 turns on the second power supply system due to input of a recovery causing signal which causes recovery from the power saving mode from the logic OR gate 11004 (a signal (power on (UI)) indicative of a user's input to the operating section 2012), a signal (power on (network)) indicative of reception of print data by the network section 2010, or a signal (power on (FAX)) indicative of reception of facsimile data by the MODEM 2050 to the flip-flop circuit 11002, so that the power supply to the CPU 2001 is resumed thereafter.

In a step S3005, the CPU 2001 determines from the flag read in from the general input port GPI<0> whether or not the power saving mode flag has been set in the flip-flop circuit 11005. If the power saving mode flag has been set, the present process proceeds to a step S3006, whereas if not, the same proceeds to a step S3007.

In the step S3006, since the power saving mode flag has been set, the CPU 2001 reads out the main program from the SDRAM 2002 for control of the printer 108.

On the other hand, in the step S3007, since the power saving mode flag has not been set, the CPU 2001 reads out the main program from the HDD 2004 for control of the printer 108 to download the same into the SDRAM 2002, and then reads out the main program from the SDRAM 2002.

In a step S3008, the CPU 2001 controls the printer 108 by executing the main program read from the SDRAM 2002 in the step S3006 or the same read from the HDD 2004 in the step S3007.

As described above, according to the first embodiment, when the printer 108 is switched to the power saving mode, the main program to be executed by the CPU 2001 is stored in the RAM 2002, and then the FET 11001 interrupts the power supply to the CPU 2001. When the printer 108 recovers from the power saving mode to the normal operating mode, the flip-flop circuit (FF) 11002 operates in response to the signal form the logic OR gate 11004 to turn off the FET 11001 to cause the same to supply power to the CPU 2001, and the CPU 2001 supplied with power is started to read out the main program stored in the RAM 2002, for execution.

The power consumed by the CPU 2001 is relatively high, so that during execution of the power saving mode, the power consumption of the controller unit 2001 is reduced.

Further, when the printer 108 recovers the normal operating mode from the power saving mode, the CPU 2001 reads out and executes the main program from the RAM 2002 supplied with power during execution of the power saving mode and storing the main program. Therefore, compared with the case where the main program is downloaded from the hard disk device 2004, it is possible to realize high-speed recovery of the normal operation mode. What is more, it is not necessary to use a sub CPU as in the prior art, either, which makes it possible to realize high-speed recovery from the power saving mode with an inexpensive information processing apparatus.

Although the first embodiment relates to the operation of the controller unit 2000 installed in the printer 108, in the power saving mode thereof, the controller unit capable of operating in the power saving mode according to the present invention is not necessarily required to be installed in an image forming apparatus, such as a printer, but the present invention is applicable to controller units (information processing apparatuses) in general, but by no means limited by the objects to be controlled by such controller units.

Next, a description will be given of a second embodiment of the present invention.

Figure 27:
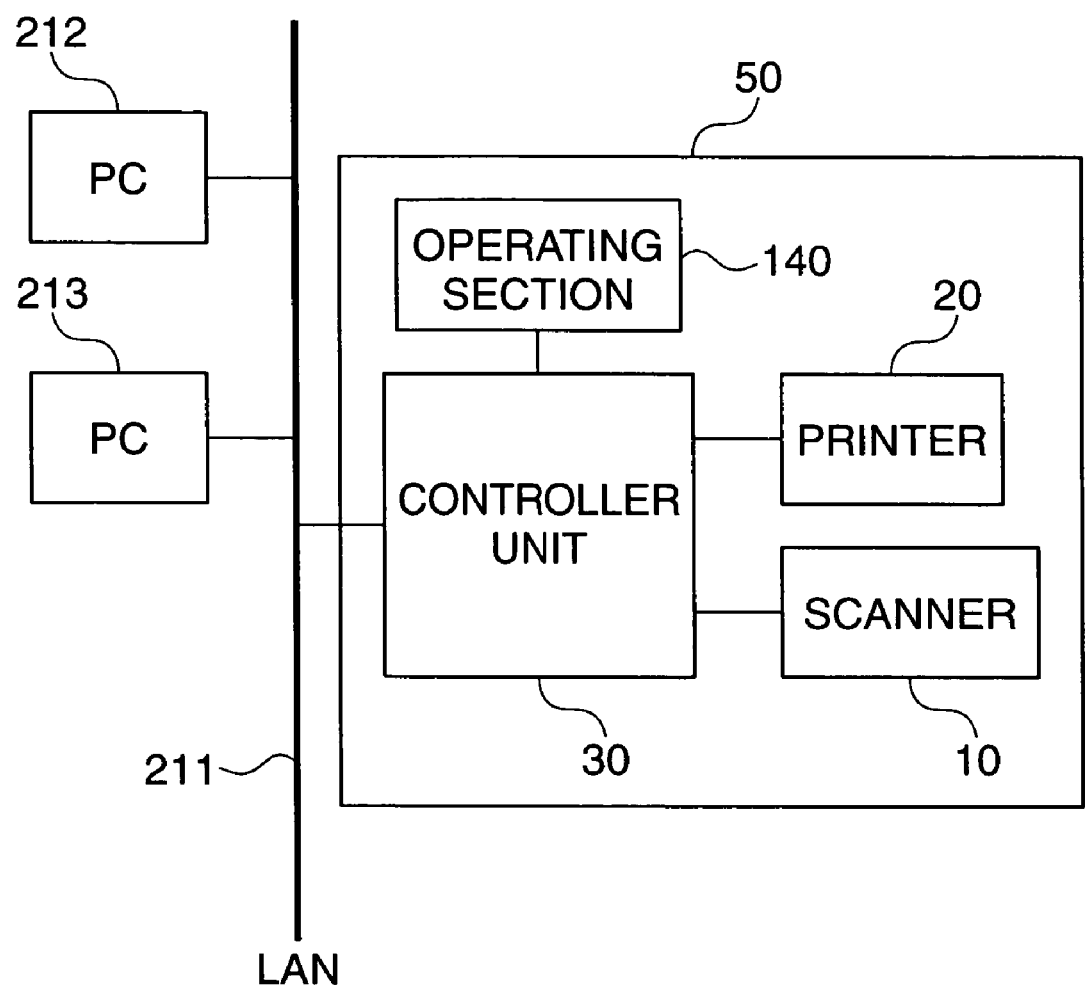
FIG. 27 is a block diagram showing the arrangement of a network system incorporating an image forming apparatus as an image processing apparatus according to a second embodiment of the present invention.

FIG. 27 is a block diagram showing the configuration of a network system incorporating an image forming apparatus as an image processing apparatus according to the second embodiment.

In FIG. 27, reference numeral 50 designates an image forming apparatus, such as a digital multifunction machine, and which is equipped with a main function of outputting images. In the image forming apparatus 50, reference numeral 140 designates an operating section for performing various input operations on the image forming apparatus 50, 10 a scanner unit for reading image information according to instructions from the operating section 140, and 20 a printer unit for printing image information on sheets.

Reference numeral 30 designates a controller unit that performs control of input and output of image information to and from the scanner unit 10 and the printer unit 20 according to instructions from PCs (Personal Computers) 212 and 213. When print data as the image information is supplied from the PC 212 or 213 via a LAN 211, the controller unit 30 causes the printer unit 20 to print out (output the image of) the print data.

Figure 28:
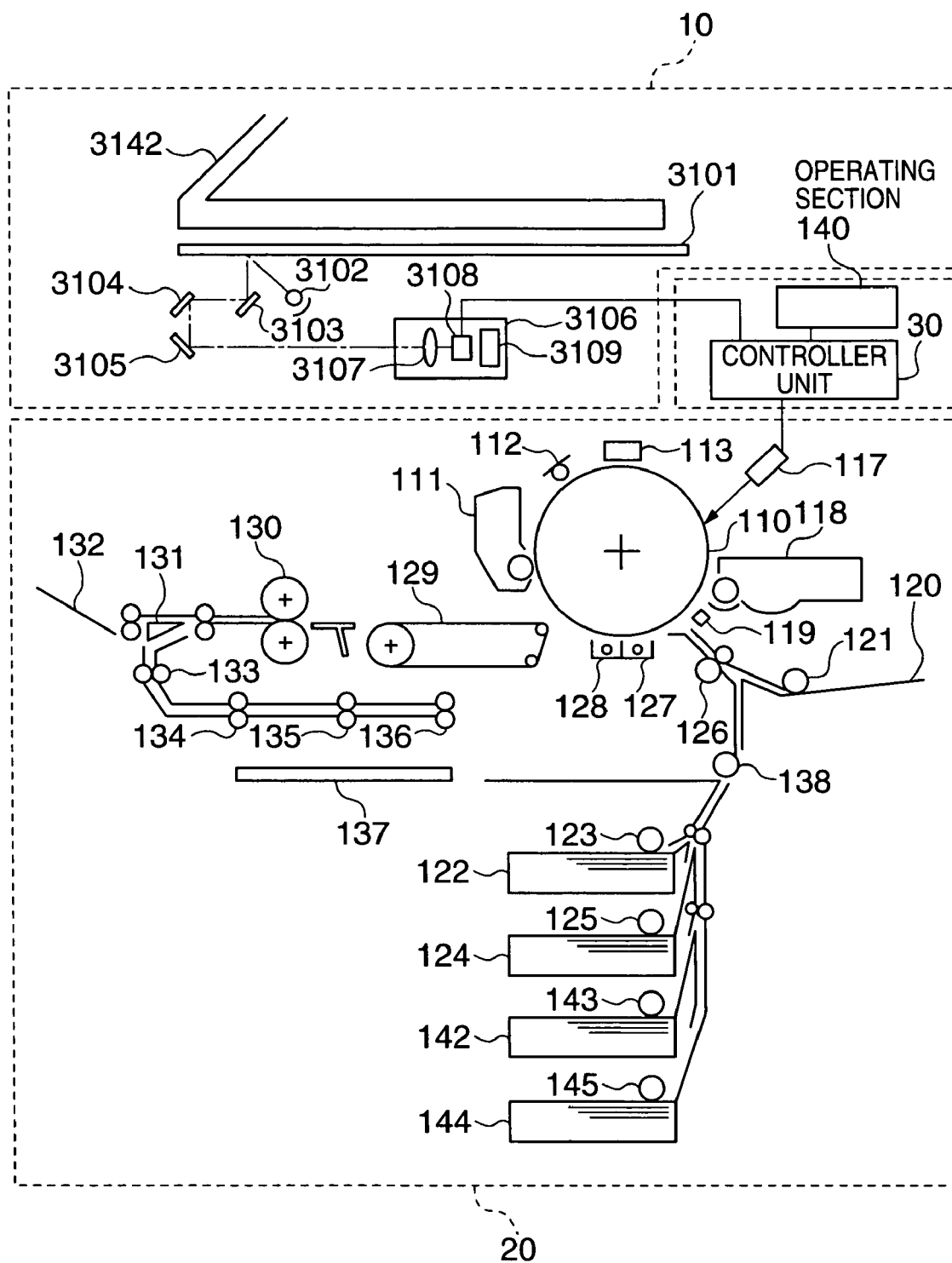
FIG. 28 is a cross-sectional view showing the internal arrangement of the image forming apparatus shown in FIG. 27.

FIG. 28 is a cross-sectional view showing the internal construction of the image forming apparatus 50 shown in FIG. 1. Hereafter, a description will be given of the operation of the image forming apparatus 50 with reference to FIG. 28.

First, in the scanner unit 10, reference numeral 3101 designates an original platen glass plate, onto which originals fed from an automatic sheet feeder 3142 are sequentially placed in a predetermined position. Reference numeral 3102 designates an original illuminating lamp implemented e.g. by a halogen lamp, for irradiating an original placed on the original platen glass 3101. Reference numerals 3103, 3104, and 3105 designate scanning mirrors, which are contained in an optical scanning unit, not shown, together with the original illuminating lamp 3102, and which make reciprocating motions to guide reflected light from the original to a CCD unit 3106. The CCD unit 3106 is comprised of an image pickup element 3108 implemented e.g. by a CCD, a focusing lens 3107 for focusing the reflected light from the original on the image pickup element 3108, a CCD driver 3109 for driving the image pickup element 3108, and so forth. An image signal from the image pickup element 3108 is delivered to the controller unit 30.

Next, in the printer unit 20, reference numeral 110 designates a photosensitive drum, which is destaticized by a pre-exposure lamp 112 to prepare for image formation. Reference numeral 113 designates a primary electrostatic charger that uniformly electrifies the photosensitive drum 110. Reference numeral 117 designates an exposure section, which is implemented e.g. by a semiconductor laser, and irradiates the photosensitive drum 110 based on the image data processed by the controller unit 30 to form a static latent image thereon, as will be described hereinafter. Reference numeral 118 designates a developing unit 118 containing a black developer (toner), while 119 designates a pre-transfer electrostatic charger that applies high voltage to the photosensitive drum 110 before a toner image developed on the photosensitive drum 110 is transferred to a sheet.

Reference numerals 120, 122, 124, 142, and 144 designate sheet feed units (120 designates a manual feed unit). Sheet feed rollers 121, 123, 125, 143, and 145 associated with the respective sheet feed units are driven to feed transfer sheets into the printer unit 20. A transfer sheet fed from each sheet feed unit is once stopped at a location where a registration roller 126 is disposed, and then advanced from the registration roller 126 in synchronism with read-out timing in which the image formed on the photosensitive drum 110 is read out. Reference numeral 127 designates a transfer electrostatic charger that transfers a toner image formed on the photosensitive drum 110 to the transfer sheet fed thereto. Reference numeral 128 designates a separating electrostatic charger that separates the transfer sheet on which a transfer operation has been completed, from the photosensitive drum 110. The toner remaining on the photosensitive drum 110 without being transferred is collected by a cleaner 111. Reference numeral 129 designates a conveyor belt that conveys the transfer sheet on which the transfer process has been completed to a fixing unit 130, where the sheet is fixed e.g. by heat.

Reference numeral 131 designates a flapper that switches the conveying direction of the transfer sheet, for which the transfer process has been completed, between a direction toward a sorter 132 and a direction toward an intermediate tray 137. Further, reference numerals 133 to 136 designate feed rollers, which feed the transfer sheet, for which the fixing process has once been completed, after inverting the same (for multiple printing) or without inverting the same (for double-sided printing). Reference numeral 138 designates a re-feed roller that again feeds the transfer sheet placed on the intermediate tray 137 up to a location where the registration roller 126 is disposed.

The controller unit 30 includes a microcomputer, referred to hereinafter, an image processing section, and so forth, and performs an image forming process according to instructions from the operating section 140.

Figure 29:
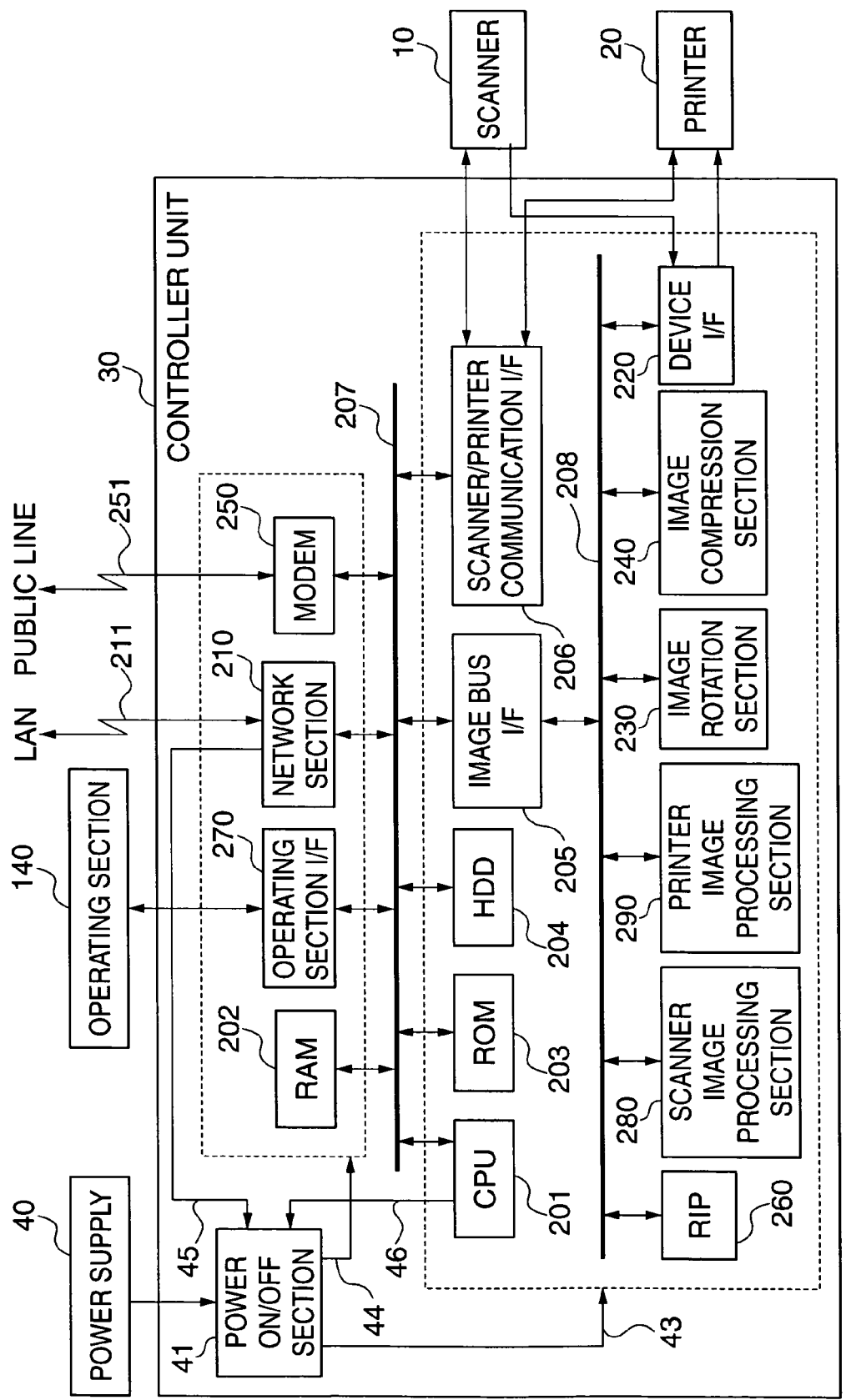
FIG. 29 is a block diagram showing the internal arrangement of a controller unit appearing in FIG. 27.

FIG. 29 is a block diagram showing the internal arrangement of the controller unit 30.

The controller unit 30 is connected to the scanner unit 10 as the image input device, and the printer unit 20 as the image output device, and further connected to a LAN 211 and a public line (WAN) 251, for controlling the input and output of image information and device information. A CPU (Central Processing Unit) 201 controls the overall system. A RAM 202 is a system work memory used for the CPU 201 to operate, and also serves as an image memory for temporarily storing image data. A ROM 203 is a boot ROM that stores a boot program of the system. A HDD 204 is a hard disk drive that stores system software, image data, and software counter values, and so forth.

An operating section I/F 270 interfaces with the operating section 140, and outputs image data to be displayed on the operating section 140 to the same, and information that the user has inputted to the operating section 2012 to the CPU 201. A network section 210 is connected to the LAN 211 to input and output information. A MODEM 250 is connected to the public line 251 to input and output information. A scanner and printer communication I/F 206 provides an interface for communication with respective CPUs included in the scanner unit 10 and the printer unit 20. The devices described above are connected to a system bus 207.

An image bus I/F 205 is a bus bridge that connects between the system bus 207 and an image bus 208 that transfers image data at high speed and converts the data structure. The image bus 208 is implemented by a PCI bus or an IEEE 1394 bus. Connected to the image bus 2008 are devices described hereinafter.

A raster image process (RIP) 260 expands a PDL code into a bit map image. A device I/F section 220 connects the scanner unit 10 and the printer unit 20 as the image input and output devices to the controller unit 30 to carry out synchronous to asynchronous conversion of image data. A scanner image processing section 280 corrects, processes, and edits inputted image data. A printer image processing section 290 performs correction, resolution conversion, and so forth, on image data for printing output, so as to adapt the image data to the performance of the printer unit 20. An image rotation section 230 rotates image data. An image compression section 240 performs JPEG-based compression and expansion of multivalued image data, and JBIC-, MMR-, or MH-based compression and expansion of binary image data.

Power is supplied from a power supply 40 to the controller unit 30 via a power ON/OFF section 41, wherein feed lines to circuit elements of the controller unit 30 are divided into a plurality of feeding systems 43 and 44 which are selectively turned on and off. The power supply 40 is a device that converts commercial AC power to DC power. The feed line 43 is connected to the devices 201, 203 to 206, 220, 230, 240, 260, 280, and 290, and the feed line 44 is connected to the devices 202, 210, 250, and 270.

Next, a description will be given of a sequence of operations of the image forming apparatus 50, including the start, printing output, transition to the power saving mode, and recovery from the power saving mode, with reference to FIG. 29.

First, a main switch (SW), not shown, of the image forming apparatus 50 is turned on, power starts to be supplied from the power supply 40 to the controller unit 30, and the power ON/OFF section 41 causes both the feed lines 43 and 44 to be turned on (execute feeding of power). This causes the controller unit 30 to start a boot sequence according to the boot program stored in the ROM 203.

A system program for executing the sequence of boot operations of the image forming apparatus 50 is stored in the HDD 204, and according to the boot sequence, the system program is read from the HDD 204 to be stored in the RAM 202. The CPU 201 executes the system program downloaded into the RAM 202 whereby a sequence of operations of the image forming apparatus are executed.

Now, a description will be given of an example of operations executed by the image forming apparatus 50, for printing out image information sent from the PC 212 or PC 213 connected to the LAN 211.

In the controller unit 30, the CPU 201 causes print data as image information sent from the PC 212 or the PC 213 connected to the LAN 211 to be stored via the network section 210 in the RAM 202. The print data is read out from the RAM 202, and sent to the RIP 260 via the image bus I/F 205 to the RIP 260. The print data is in the form of PDL (Page Description Language) data, and in the RIP 260, the PDL data is expanded into bit map data, and then the bit map data is compressed by the image compression section 240, as required, and accumulated in the HDD 204 via the image bus I/F 205.

In executing printing output to the printer unit 20, the bit map data accumulated in the HDD 204 is sent via the image bus I/F 205 to the image compression section 240, wherein it is expanded this time, and then the printer image processing section 290 performs correction, resolution conversion, and so forth, on the expanded bit map image data so as to adapt the same to the performance of the printer 20. After being rotated, as required, by the image rotation section 230, the image data is sent via the device I/F 220 to the printer unit 20, wherein it is printed out.

Next, a description will be given of a transition to the power saving mode of the image forming apparatus 50 executed by the controller unit 30.

In transition to the power saving mode, the CPU 201 controls the power ON/OFF section 41 via the line 46, such that the power ON/OFF section 41 turns off the feed line 43 (stops feeding of power) and keeps the feed line 44 on (continues to execute feeding of power).

Thus, during execution of the power saving mode, the power ON/OFF section 41 turns off the feed line 43, so that the power consumption by the main circuit elements of the controller unit 30, including the CPU 201, is reduced. What is more, since the feed line 44 to the network section 210 of the controller unit 30 is kept on, the network section 210 is capable of giving a power-on instruction to the power ON/OFF section 41 via the line 45, when a signal is received via the LAN 211 by the network section 210, even during execution of the power saving mode. Upon receiving the power-on instruction from the network section 210, the power ON/OFF section 41 turns on the feed line 43 as well to switch the image forming apparatus 50 to the normal operation mode. This operation will be described in detail hereinafter.

During execution of the power saving mode, the power is also supplied to the RAM 202, due to the self-refresh operation, the system program stored in the RAM 202 is preserved without being erased.

Further, during execution of the power saving mode, the power is also supplied to the MODEM 250, which makes it possible to perform facsimile communications using the public line 251, even during execution of the power saving mode.

Also, during execution of the power saving mode, the power is also supplied to the operating section I/F 270, which makes it possible for the controller unit 30 to respond to an instruction for recovery of the image forming apparatus 50 from the power saving mode to the normal operation mode given by the user to the operating section 140 during execution of the power saving mode.

Next, a description will be given of recovery of the image forming apparatus 50 from the power saving mode to the normal operation mode executed by the controller unit 30.

When a print command is sent from the PC 212 to the network section 210 via the LAN 211, the network section 210 receives and interprets the print command to send a control signal to the power ON/OFF section 41 via the line 45. Responsive to the control signal, the power ON/OFF section 41 turns on the feed line 43.

When the feed line 43 is turned on, the CPU 201 is activated, and at this time, the CPU 201 determines, from the operative status of the power ON/OFF section 41, whether the activation of the CPU 201 is caused by recovery from the power saving mode to the normal operation mode, or turn-on of the main switch of the image forming apparatus 50. If the determination result shows that the activation is caused by the recovery from the power saving mode, the CPU 201 executes the system program which was stored in the RAM upon transition to the power saving mode with execution of the operation of downloading the system program from the HDD 204 into the RAM 202 being omitted among the above described boot sequence of operations.

This enables the CPU 201 to respond to the print command received from the PC 212 to thereby cause the printer unit 20 to perform printing output.

After the printing output is completed, the CPU 201 starts measurement of time, and if no external input has occurred for a predetermined time period, the CPU 201 gives an instruction for switching the controller unit 30 to the power saving mode to the power ON/OFF section 41. In response to the instruction, the power ON/OFF section 41 turns off the power line 43. This switches the controller unit 30 to the power saving mode in which the power consumption is reduced.

As described above, according to the second embodiment as well, during execution of the power saving mode, the power consumption by the controller unit 30 can be largely reduced, and what is more, it is possible to realize high-speed recovery of the normal operation mode.

Although also the above-described second embodiment relates to the operation of the controller unit 30 installed in the image forming apparatus 50 in the power saving mode thereof, the controller unit capable of operating in the power saving mode according to the present invention is not necessarily required to be installed in an image forming apparatus, but the present invention is applicable to controller units (information processing apparatuses) in general, but by no means limited by the object to be controlled by such controller units.

Next, a description will be given of a third embodiment of the present invention with reference to FIGS. 31 to 33.

Figure 31:
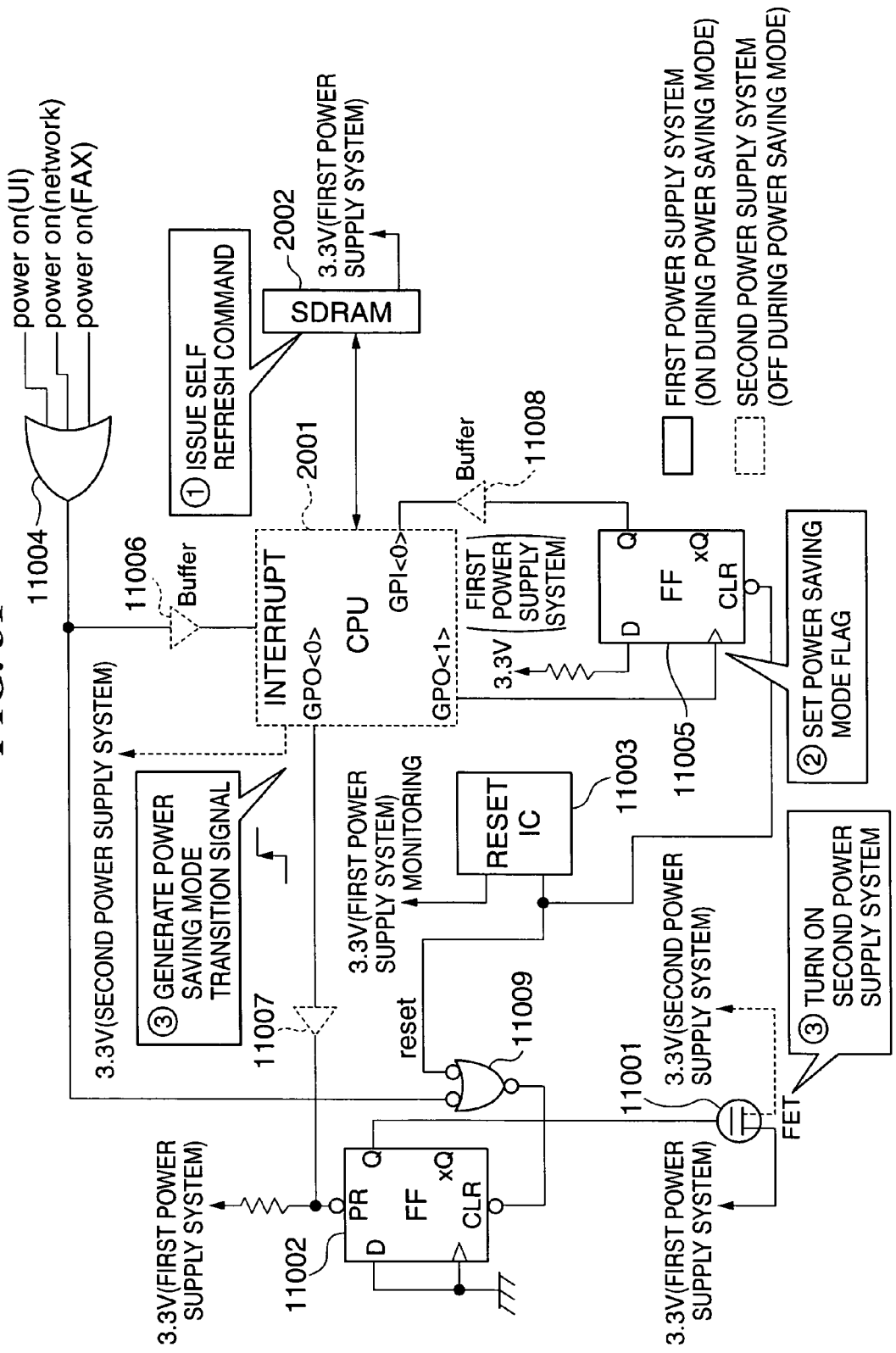
FIG. 31 is diagram showing the arrangement of a main part and a circuit for a power saving mode operation of the controller unit of the image processing apparatus according to the third embodiment, in which a sequence of control operations of the controller unit during transition to a power saving mode are explicitly shown.
Figure 32:
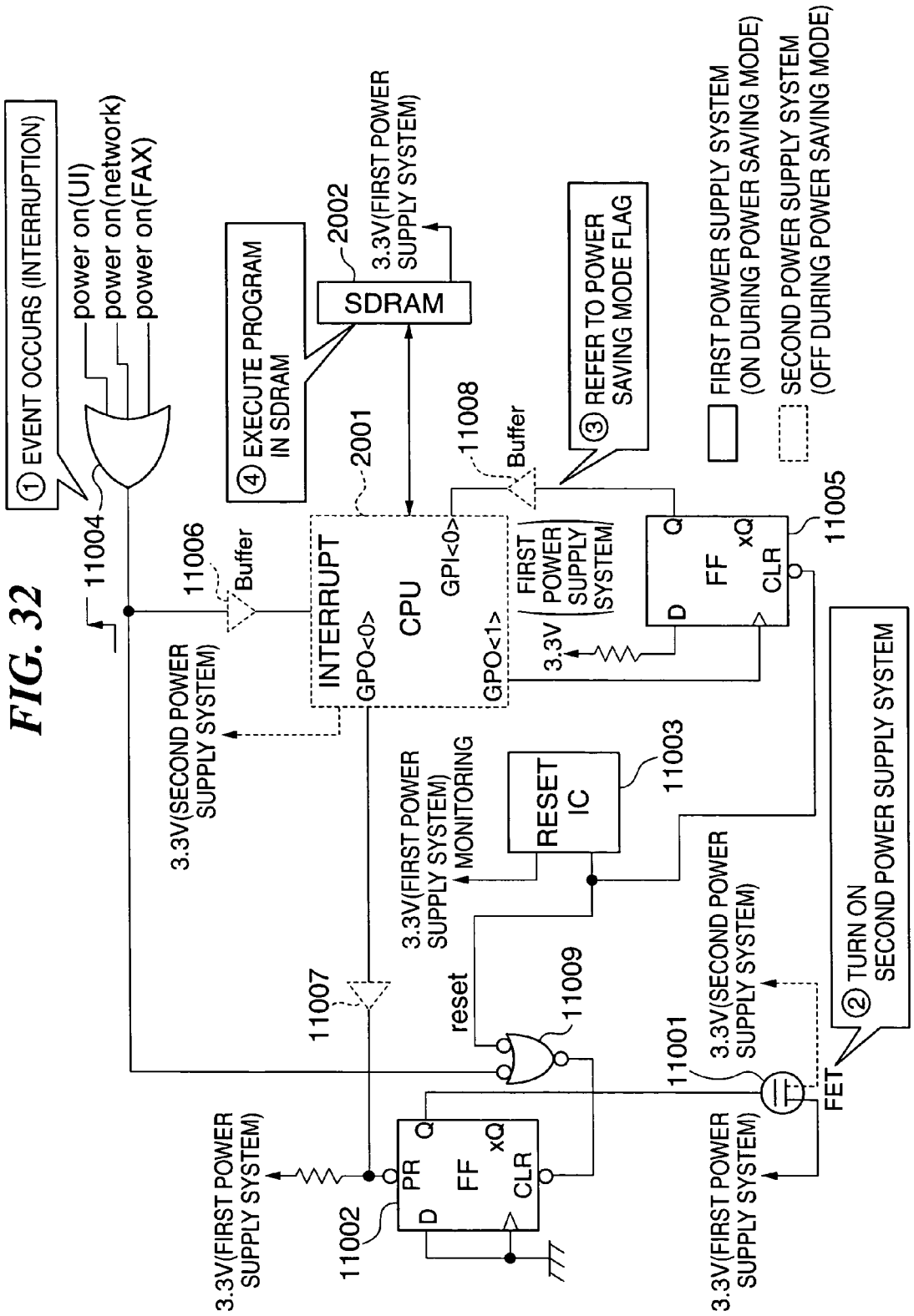
FIG. 32 is a diagram showing the arrangement of the main part and the circuit for the power saving mode operation of the controller unit of the image processing apparatus according to the third embodiment, in which a sequence of control operations of the controller unit during recovery from the power saving mode are explicitly shown.
Figure 33:
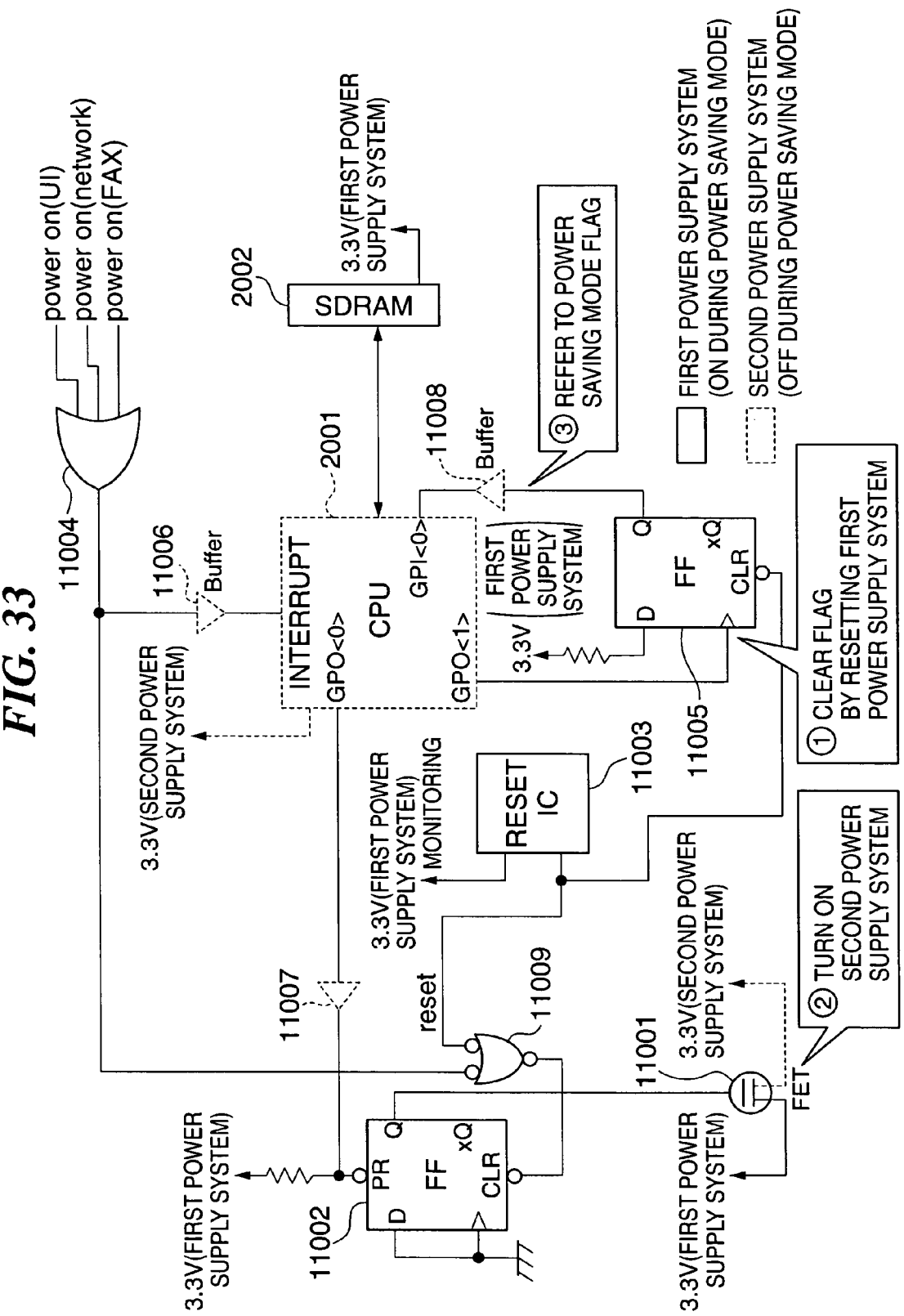
FIG. 33 is a diagram showing the arrangement of the main part and the circuit for the power saving mode operation of the controller unit of the image processing apparatus according to the third embodiment, in which a sequence of control operations of the controller unit performed when a user turns on a main power supply from an OFF state thereof to start the printer are explicitly shown.

FIGS. 31 to 33 in the third embodiment correspond to FIGS. 24 to 26 in the first embodiment described above, but are distinct from the latter in that a logic OR gate 11009 is provided.

The third embodiment realizes a controller unit 2000 which properly operates in whatever timing a recovery causing signal (a signal (power on (UI))) indicative of user's input to the operating section 2012, a signal (power on (network)) indicative of reception of print data by the network section 2010, or a signal (power on (FAX)) indicative of reception of facsimile data by the MODEM 2050) are inputted to the logic OR gate 11004.

In the case of the control unit 2000 in the first embodiment in FIG. 24, when the CPU 2001 determines that the normal operating mode should be switched to the power saving mode, the output from the general output port GP0<0> thereof to the PR terminal of the flip-flop circuit 11002 is changed to thereby preset the output from the Q terminal of the flip-flop circuit 11002 to a high level.

In this case, even if the recovery causing signal is inputted to the logic QR gate 11004 before the CPU 2001 changes the output from the general output port GP0<0> thereof to the PR terminal of the flip-flop circuit 11002, the output from the Q terminal of the flip-flop circuit 11002 is preset to a high level. Therefore, even when the printer 108 should be set to the normal operation mode, the switching of the FET 11001 turns off the second power supply system.

Then, since the second power supply system is turned off, the power supply to the CPU 2001 is interrupted. More specifically, in this case, the printer 108 turns off the second power supply system, so that the printer 108 enters the power saving mode. As will be understood from the above, the controller unit 2000 in the first embodiment is disadvantageous in that the second power supply system is once turned off even when the recovery causing signal for recovery of the normal operation mode is inputted, and therefore, to recover the printer 108 into the operative state, the recovery process of the CPU 2001 needs to be executed by turning on the second power supply system, which takes time.

The third embodiment solves the above-described problem in the following manner.

First, as shown in FIG. 31, when the recovery causing signal is inputted to the controller unit 2000, the signal is inputted to the logic OR gate 11009, which in turn generates and applies a signal for clearing the output from the Q terminal to the CLR terminal of the flip-flop circuit 11002.

Then, when the CPU 2001 determines that the normal operation mode should be switched from the normal operating mode to the power saving mode, the output from the general output port GP0<0> to the PR terminal of the flip-flop circuit 11002 is changed. Since the signal for clearing the output from the Q terminal has been inputted from the logic OR gate 11009 to the CLR terminal of the flip-flop circuit 11002, even if the output to the PR terminal is changed (even if the CPU 2001 generates the power saving mode transition signal), the output from the Q terminal is not preset to the high-level. Namely, the FET 11001 does not turn off the second power supply system, so that the power supply to the CPU 2001 is not shut down. That is, in this case, the printer 108 does not turn off the second power supply system, so that the printer 108 does not enter the power saving mode.

As described above, the controller unit 2000 in the third embodiment does not turn off the second power supply system when a recovery causing signal for recovery of the normal operation mode is inputted. As a result, the recovery process of the CPU 2001 need not be executed which would be necessitated if the second power supply system were once turned off, thus leading to time saving.

FIGS. 32 and 33 are similar to FIGS. 25 and 26 in the first embodiment, and are distinct from the latter only in that the logic OR gate 11009 is provided. The operations of the controller unit 2000 in FIGS. 32 and 33 are similar to those of the controller unit 2000 in FIGS. 25 and 26, and therefore duplicate description thereof is omitted.

As described above, according to the third embodiment, even when a transition signal for causing the image processing apparatus to switch from a first power supply status a second power supply status in which power consumption is reduced is received immediately after receiving a recovery signal indicative of a factor for causing the image processing apparatus to switch from the second power supply status to the first power supply state, it is possible to maintain the first power supply state without entering the second power supply status.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus that performs image processing based on image data inputted thereto, comprising:
    a controller that controls the image processing apparatus, said controller determining whether or not the image processing apparatus should be switched from a first power supply status to a second power supply status in which power consumption of the image processing apparatus is lower than in the first power supply status;
    a holding unit that is responsive to a determination by said controller that the image processing apparatus should be switched from the first power supply status to the second power supply status, for holding information indicative of whether or not the image processing apparatus has been switched to the second power supply status;
    a first storage unit that stores control data based on which said controller controls the image processing apparatus, said first storage unit being non-volatile;
    a second storage unit that stores the control data read out from said first storage device, said second storage unit being volatile;
    an input unit that inputs image data from an external device; and
    a switching unit that is responsive to the determination by said controller that the image processing apparatus should be switched to the second power supply status, for switching a power supply status of the image processing apparatus such that power supply to said controller is shut down, wherein:

said switching unit switches the power supply status such that the power supply to said controller is resumed, in response to the input of the image data, and said controller is responsive to the resumption of the power supply to said controller, for reading out the information from said holding unit, said controller reading out the control data from said second storage unit in a case where the information indicates that the image processing apparatus has been switched to the second power supply status, reading out the control data from said first storage unit in a case where the information does not indicate that the image processing apparatus has been switched to the second power supply status, and controlling the image processing apparatus based on the control data.

2. An image processing apparatus according to claim 1, further comprising a second input unit that inputs a transition instruction from a user, for switching the image processing apparatus from the first power supply status to the second power supply status, and wherein said controller is responsive to the input of the transition instruction from said second input unit, for causing the image processing apparatus to be switched from the first power supply status to the second power supply status.

3. An image processing apparatus according to claim 1, wherein said controller causes the image processing apparatus to be switched from the first power supply status to the second power supply status, in a case where the image processing apparatus has not been in operation for not less than a predetermined time period.

4. An image processing apparatus according to claim 1, wherein the control data comprises a control program for controlling the image processing apparatus, and wherein said controller controls the image processing apparatus by executing the control program.

5. An image processing apparatus according to claim 1, wherein said holding unit erases the information indicating that the image processing apparatus has been switched to the second power supply status, in a case where the power supply status of the image processing apparatus has been switched to a power shutdown status.

6. An image processing apparatus according to claim 1, wherein said controller is responsive to the resumption of the power supply to said controller, for reading out the information from said holding unit, said controller reading out the control data from said first storage unit, storing the control data in said second storage unit, and then reading out the control data from said second storage unit, for control of the image processing apparatus, in a case where the information does not indicate that the image processing apparatus has been switched to the second power supply status.

7. An image processing apparatus according to claim 1, wherein said second storage unit is DRAM and, said controller is responsive to the determination that the image processing apparatus should be switched from the first power supply status to the second power supply status, for sending a signal for starting a self-refresh operation to said second storage unit.

8. An image processing apparatus according to claim 1, wherein the first power supply status is a status in which image processing can be carried out, and the second power supply status is a status in which the image processing cannot be carried out.

9. An image processing apparatus according to claim 1, wherein in a case where a signal for causing the image processing apparatus to be switched from the second power supply status to the first power supply status is inputted, said switching unit does not switch the power supply of the image processing apparatus such that the power supply to said controller is shut down, regardless of whether a signal for causing the image processing apparatus to be switched from the first power supply status to the second power supply status is inputted or not.

10. A method of controlling an image processing apparatus that performs image processing based on image data inputted thereto, comprising:

a determining step of determining whether or not the image processing device should be switched from a first power supply status to a second power supply status in which power consumption of the image processing apparatus is lower than in the first power supply status;

a holding step of holding information indicative of whether or not the image processing apparatus has been switched to the second power supply status, in response to a determination in said determining step that the image processing apparatus should be switched from the first power supply status to the second power supply status;

an input step of inputting image data from an external device;

a first switching step of switching a power supply status of the image processing apparatus such that power supply to a controller that controls the image processing apparatus is shut down, in response to output of a transition signal for causing the image processing apparatus to be switched from the first power supply status to the second power supply status;

a second switching step of switching the power supply status of the image processing apparatus from the second power supply status to the first power supply status such that the power supply to the controller is resumed, in response to the input of the image data;

a reading step of reading out the information held in said holding step, in response to the resumption of the power supply to said controller; and a control step of reading out control data for controlling the image processing apparatus from a first storage unit which is non-volatile, in a case where the information read out in said reading step does not indicate that the image processing apparatus has been switched to the second power supply status, and reading out the control data from a second storage unit which is volatile, in a case where the information indicates that the image processing apparatus has been switched to the second power supply status.

11. A method according to claim 10, further comprising a second input step of inputting a transition instruction from a user, for switching the image processing apparatus from the first power supply status to the second power supply status, and wherein said control step comprises causing the image processing apparatus to be switched from the first power supply status to the second power supply status, in response to the input of the transition instruction in said second input step.

12. A method according to claim 10, wherein said control step comprises causing the image processing apparatus to be switched from the first power supply status to the second power supply status, in a case where the image processing apparatus has not been in operation for not less than a predetermined time period.

13. A method according to claim 10, wherein the control data comprises a control program for controlling the image processing apparatus, and wherein said control step comprises controlling the image processing apparatus by executing the control program.

14. A method according to claim 10, wherein said holding step comprises erasing the information indicating that the image processing apparatus has been switched to the second power supply status, in a case where the power supply status of the image processing apparatus has been switched to a power shutdown status.

15. A method according to claim 10, wherein said control step comprises reading out the control data from the first storage unit, storing the control data in the second storage unit, and then reading out the control data from the second storage unit, for control of the image processing apparatus, in a case where the information read out in said reading step does not indicate that the image processing apparatus has been switched to the second power supply status.

16. A method according to claim 10, wherein said control step comprises sending a signal for starting a self-refresh operation to the second storage unit, in response to the determination in said determining step that the image processing apparatus should be switched from the first power supply status to the second power supply status.

17. A method according to claim 10, wherein the first power supply status is a status in which image processing can be carried out, and the second power supply status is a status in which the image processing cannot be carried out.

18. A method according to claim 10, wherein in a case where a signal for causing the image processing apparatus to be switched from the second power supply status to the first power supply status is inputted, the power supply of the image processing apparatus is not switched such that the power supply to the controller is shut down, regardless of whether a signal for causing the image processing apparatus to be switched from the first power supply status to the second power supply status is inputted or not.

* * * * *